(12) United States Patent
Sakai et al.

(10) Patent No.: US 8,269,390 B2
(45) Date of Patent: Sep. 18, 2012

(54) PERMANENT-MAGNET-TYPE ROTATING ELECTRICAL MACHINE AND PERMANENT MAGNET MOTOR DRIVE SYSTEM

(75) Inventors: Kazuto Sakai, Yokosuka (JP); Kazuaki Yuuki, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 12/918,715

(22) PCT Filed: Feb. 16, 2009

(86) PCT No.: PCT/JP2009/052536
§ 371 (c)(1),
(2), (4) Date: Aug. 20, 2010

(87) PCT Pub. No.: WO2009/104553
PCT Pub. Date: Aug. 27, 2009

(65) Prior Publication Data
US 2010/0327689 A1    Dec. 30, 2010

(30) Foreign Application Priority Data

Feb. 21, 2008  (JP) ................................ 2008-040448

(51) Int. Cl.
*H02K 21/12* (2006.01)
(52) U.S. Cl. .......... 310/156.43; 310/156.53; 310/156.56
(58) Field of Classification Search ............. 310/156.43, 310/156.53–156.61
See application file for complete search history.

(56) References Cited

U.S. PATENT DOCUMENTS

| | | | |
|---|---|---|---|
| 6,800,977 B1 | 10/2004 | Ostovic | |
| 6,849,981 B2 * | 2/2005 | Kojima et al. | 310/156.43 |
| 6,849,983 B2 * | 2/2005 | Tajima et al. | 310/166 |
| 7,800,271 B2 * | 9/2010 | Komuro et al. | 310/156.53 |
| 7,880,357 B2 * | 2/2011 | Suzuki et al. | 310/156.43 |
| 8,044,548 B2 * | 10/2011 | Sakai et al. | 310/156.43 |
| 8,072,109 B2 * | 12/2011 | Yamashita et al. | 310/156.43 |
| 2009/0236923 A1 | 9/2009 | Sakai et al. | |
| 2009/0261774 A1 | 10/2009 | Yuuki et al. | |

(Continued)

FOREIGN PATENT DOCUMENTS

JP  7 336919   12/1995

(Continued)

OTHER PUBLICATIONS

U.S. Appl. No. 12/918,770, filed Aug. 20, 2010, Sakai et al.

(Continued)

*Primary Examiner* — Thanh Lam
(74) *Attorney, Agent, or Firm* — Oblon, Spivak, McClelland, Maier & Neustadt, L.L.P.

(57) ABSTRACT

A permanent-magnet-type rotating electrical machine capable of realizing variable-speed operation in a wide range from low speed to high speed at high output and improving, in a wide operating range, efficiency, reliability, and productivity. The rotating electrical machine includes a first permanent magnet whose product of coercive force and magnetizing direction thickness is small and a second permanent magnet whose product of coercive force and magnetizing direction thickness is large, to form a magnetic pole. The product of coercive force and magnetizing direction thickness of the first permanent magnet is equal to or larger than the product of magnetic field strength and magnetizing direction thickness of the second permanent magnet at a no-load operating point. At the magnetic pole, a magnetic field created by a current of an armature coil magnetizes the first permanent magnet, irreversibly changing a flux amount of the first permanent magnet.

8 Claims, 17 Drawing Sheets

U.S. PATENT DOCUMENTS

| | | |
|---|---|---|
| 2010/0060223 A1 | 3/2010 | Sakai et al. |
| 2010/0171385 A1 | 7/2010 | Sakai et al. |
| 2010/0201294 A1 | 8/2010 | Yuuki et al. |

FOREIGN PATENT DOCUMENTS

| | | |
|---|---|---|
| JP | 7 336980 | 12/1995 |
| JP | 11 27913 | 1/1999 |
| JP | 11 136912 | 5/1999 |
| JP | 2006 280195 | 10/2006 |
| WO | 2008 013167 | 1/2008 |
| WO | 2008 018354 | 2/2008 |

OTHER PUBLICATIONS

Takeda, Y. et al., "Design and Control of Interior Permanent Magnet Synchronous Motor", Ohmsha, Total Pages 20 (Oct. 25, 2001) (with English translation).

Weschta, A. "Schaechung Des Erregerfelds Bei Einer Dauermagneterregten Synchronmaschine", Etz Archin, vol. 7, No. 3, pp. 79-84 (1985).

Office Action (with English translation) issued on Jul. 3, 2012, in counterpart Japanese Application No. 2007-079327 (5 pages).

* cited by examiner

PERMANENT-MAGNET-TYPE ROTATING ELECTRICAL MACHINE AND PERMANENT MAGNET MOTOR DRIVE SYSTEM

TECHNICAL FIELD

The present invention relates to a permanent-magnet-type rotating electrical machine, a method of assembling a permanent-magnet-type rotating electrical machine, a method of disassembling a permanent-magnet-type rotating electrical machine, and a permanent magnet motor drive system.

BACKGROUND TECHNOLOGY

Generally, permanent-magnet-type rotating electrical machines are classified into two types. One is a surface-permanent-magnet-type rotating electrical machine having permanent magnets adhered to an outer circumferential face of a rotor core and the other is an internal-permanent-magnet-type rotating electrical machine having permanent magnets embedded in a rotor core. For a variable-speed driving motor, the internal-permanent-magnet-type rotating electrical machine is appropriate.

With reference to FIG. 20, a configuration of a conventional internal-permanent-magnet-type rotating electrical machine will be explained. Along an outer circumference of a rotor core 2 of a rotor 1, rectangular hollows are arranged at regular intervals, the number of the rectangular hollows being equal to the number of poles. In FIG. 20, the rotor 1 has four poles, and therefore, four hollows are arranged to receive permanent magnets 4, respectively. Each permanent magnet 4 is magnetized in a radial direction of the rotor 1, i.e., in a direction orthogonal to a side (long side in FIG. 20) of the rectangular section of the permanent magnet 4 that faces an air gap. The permanent magnet 4 is usually an NdFeB permanent magnet having a high coercive force so that it is not demagnetized with a load current. The rotor core 2 is formed by laminating electromagnetic sheets through which the hollows are punched. The rotor 1 is incorporated in a stator 20. The stator 20 has an armature coil 21 that is received in a slot formed inside a stator core 22. An inner circumferential face of the stator 20 and an outer circumferential face of the rotor 1 face each other with the air gap 23 interposing between them.

Known examples of such a permanent-magnet-type rotating electrical machine are described in "Design and Control of Internal Magnet Synchronous Motor," Takeda Yoji, et al., a document of Ohm-sha Publishing (Non-Patent Document 1) and Japanese Unexamined Patent Application Publication No. H07-336919 (Patent Document 1). An example of a high-output rotating electrical machine having an excellent variable-speed characteristic is a permanent-magnet-type reluctance motor. Examples thereof are described in Japanese Unexamined Patent Application Publication No. H11-27913 (Patent Document 2) and Japanese Unexamined Patent Application Publication No. H11-136912 (Patent Document 3). Further, there is an internal permanent motor employing AlNiCo magnets whose magnetic force is changed. Examples thereof are described in United States Patent Publication No. 6800977 (Patent Document 4) and Weschta, "Schachung des Erregerfelds bei einer dauermagneterregten Synchronmaschine", ETZ Archiv Vol. 7, No. 3, pp. 79-84 (1985) (Non-Patent Document 2).

The rotating electrical machine of the Non-Patent Document 2 is a permanent magnet motor employing AlNiCo magnets, flux amount of the AlNiCo magnets being changed. This related art may demagnetize the AlNiCo magnets but it hardly magnetizes the AlNiCo magnets to an original magnetized state. The rotating electrical machine mentioned in the Patent Document 4 is a flux-concentration-type internal permanent magnet motor employing AlNiCo permanent magnets. This rotating electrical machine is a modification of the rotating electrical machine described in the Non-Patent Document 2, and like the rotating electrical machine of the Non-Patent Document 2, applies a magnetic field to change the flux amount of the AlNiCo magnets. The rotating electrical machine of the Patent Document 4 is a simple AlNiCo magnet motor, and therefore, provides insufficient output. When torque is produced in the rotating electrical machine of the Non-Patent Document 2 or of the Patent Document 4, the AlNiCo magnets are demagnetized by a load current, to decrease the torque. To generate sufficient torque with the AlNiCo magnets whose energy product is small, the AlNiCo magnets must be thick in a magnetizing direction. To magnetize such thick AlNiCo magnets, a very large current must be passed. Namely, the permanent magnets are hardly magnetized and the flux amount thereof becomes unchangeable.

In the permanent-magnet-type rotating electrical machine, the permanent magnets always generate constant linkage flux to increase a voltage induced by the permanent magnets in proportion to a rotation speed. Accordingly, when variable-speed operation is carried out from low speed to high speed, the voltage (counter electromotive voltage) induced by the permanent magnets becomes very high at high rotation speed. The voltage induced by the permanent magnets is applied to electronic parts of an inverter, and if the applied voltage exceeds a withstand voltage of the electronic parts, the parts will cause insulation breakage. It is necessary, therefore, to design the machine so that the flux amount of the permanent magnets is suppressed below the withstand voltage. Such a design, however, lowers the output and efficiency of the permanent-magnet-type rotating electrical machine in a low-speed zone.

If the variable-speed operation is carried out in such a way as to provide nearly a constant output from low speed to high speed, the voltage of the rotating electrical machine will reach an upper limit of a power source voltage in a high rotation speed zone, not to pass a current necessary for output because the linkage flux of the permanent magnets is constant. This greatly drops the output in the high rotation speed zone, so that the variable-speed operation will not be carried out in a wide range up to high rotation speed.

Recent techniques of expanding a variable-speed range employ flux-weakening control such as one described in the Non-Patent Document 1. A total linkage flux amount of an armature coil is the sum of flux by a d-axis current and flux by permanent magnets. The flux-weakening control generates flux with a negative d-axis current to reduce the total linkage flux amount. The flux-weakening control makes a permanent magnet of high coercive force operate in a reversible range on a magnetic characteristic curve (B-H characteristic curve). For this, the permanent magnet must be an NdFeB magnet of high coercive force so that it may not irreversibly demagnetized with a demagnetizing field produced by the flux-weakening control.

In the flux-weakening control, flux produced by a negative d-axis current reduces linkage flux and a reduced portion of the linkage flux produces a voltage margin for an upper voltage limit. This makes it possible to increase a current for a torque component, thereby increasing an output in a high-speed zone. In addition, the voltage margin makes it possible to increase a rotation speed, thereby expanding a variable-speed operating range.

Always passing a negative d-axis current that contributes nothing to an output, however, increases a copper loss to deteriorate efficiency. In addition, a demagnetizing field produced by the negative d-axis current generates harmonic flux that causes a voltage increase. Such a voltage increase limits the voltage reduction achieved by the flux-weakening control. These factors make it difficult for the flux-weakening control to conduct the variable-speed operation for the internal-permanent-magnet-type rotating electrical machine at speeds over three times a base speed. In addition, the harmonic flux increases an iron loss to drastically reduce efficiency in middle- and high-speed zones. Further, the harmonic flux generates an electromagnetic force that produces vibration.

When the internal-permanent magnet motor is employed as a drive motor of a hybrid car, the motor rotates together with an engine when only the engine is used to drive the hybrid car. In this case, voltage induced by permanent magnets of the motor increases at middle and high rotation speeds. To suppress the induced voltage below a power source voltage, the flux-weakening control continuously passes the negative d-axis current. The motor in this state produces only a loss to deteriorate an overall operating efficiency.

On the other hand, when the internal-permanent magnet motor is employed as a drive motor of an electric train, the electric train sometimes carries out a coasting operation. Then, like the above-mentioned example, the flux-weakening control is carried out to continuously pass the negative d-axis current to suppress voltage induced by permanent magnets below a power source voltage. The motor in this state only produces a loss to deteriorate an overall operating efficiency.

A technique to solve these problems is disclosed in Japanese Unexamined Patent Application Publication No. 2006-280195 (Patent Document 5). The technique described in the Patent Document 5 relates to a permanent-magnet-type rotating electrical machine capable of conducting variable-speed operation in a wide range from low speed to high speed and improving efficiency and reliability. This machine includes a stator provided with a stator coil and a rotor having low-coercive-force permanent magnets whose coercive force is of such a level that a magnetic field created by a current of the stator coil may irreversibly change the flux density of the magnets and high-coercive-force permanent magnets whose coercive force is equal to or larger than twice that of the low-coercive-force permanent magnets. In a high rotation speed zone in which the voltage of the machine exceeds a maximum power source voltage, a current is passed to create a magnetic field that magnetizes the low-coercive-force permanent magnets in such a way as to reduce total linkage flux produced by the low-coercive-force and high-coercive-force permanent magnets, thereby adjusting a total linkage flux amount.

A permanent-magnet-type rotating electrical machine described in Japanese Unexamined Patent Application Publication No. H07-336980 (Patent Document 6) is a brushless DC motor. This brushless DC motor employs a rotor core having a small-coercive-force first magnet part and a large-coercive-force second magnet part. Flux amount of a magnetic pole of the rotor core is reduced by applying power to an armature coil, to invert only a magnetizing direction of the small-coercive-force first magnet part. This realizes a flux reduction without always passing an opposite field current to the armature coil during demagnetization.

In the case of this conventional brushless DC motor, the kind of magnets adopted for the first and second magnet parts is unclear and the magnetic characteristic thereof is unidentifiable because FIG. 7 indicates no values. However, the shapes of magnetic characteristic graphs thereof allow an estimation that the small-coercive-force first magnet part seems to be made of ferrite-based permanent magnets and the large-coercive-force second magnet part of NdFeB permanent magnets. Even if the two kinds of permanent magnets having large and small coercive forces as illustrated in the magnetic characteristic curves of FIG. 7 are employed, the ferrite-based permanent magnets have small coercive force, and therefore, are easily demagnetized to raise the problem of demagnetization even with a magnetic field produced by a q-axis torque current, the necessity of a large current for demagnetization, the problem of insufficient torque, and the like.

On the other hand, if a permanent magnet having a coercive force of 300 kA/m or over is employed as the permanent magnet to be demagnetized, a large current must be passed to demagnetize the same, to raise the problems of enlarging a power source and saturating parts around the permanent magnet due to a magnetic field created by the demagnetizing current, thereby preventing the demagnetization of the permanent magnet. If a remanent flux density of the permanent magnet is smaller than 0.6 T like a ferrite-based permanent magnet, the width of change in flux amount is small to raise the problem of narrowing an output variable width.

Patent Document 1: Japanese Unexamined Patent Application Publication No. H07-336919

Patent Document 2: Japanese Unexamined Patent Application Publication No. H11-27913

Patent Document 3: Japanese Unexamined Patent Application Publication No. H11-136912

Patent Document 4: United States Patent Publication No. 6800977

Patent Document 5: Japanese Unexamined Patent Application Publication No. 2006-280195

Patent Document 6: Japanese Unexamined Patent Application Publication No. H07-336980

Non-Patent Document 1: "Design and Control of Internal Magnet Synchronous Motor," Takeda Yoji, et al., Ohm-sha Publishing Non-Patent Document 2: Weschta, "Schachung des Erregerfelds bei einer dauermagneterregten Synchronmaschine", ETZ Archiv Vol. 7, No. 3, pp. 79-84 (1985)

DISCLOSURE OF INVENTION

The present invention has been made to solve the above-mentioned problems of the related arts and an object of the present invention is to provide a permanent-magnet-type rotating electrical machine and a permanent magnet motor drive system, capable of conducting variable-speed operation in a wide range from low speed to high speed, realizing high torque in a low rotation speed zone and high output in middle and high rotation speed zones, improving efficiency, reliability, and productivity, and reducing materials, in particular, rare materials.

Another object of the present invention is to provide methods of easily assembling and disassembling the permanent-magnet-type rotating electrical machine by utilizing the above-mentioned characteristics of the permanent-magnet-type rotating electrical machine.

An aspect of the present invention is a permanent-magnet-type rotating electrical machine including a rotor with first and second permanent magnets of different magnetic characteristics embedded in a rotor core symmetrically with respect to a rotation center, a stator arranged to surround the rotor with a magnetic air gap interposing between them, and an armature coil formed on an inner circumferential part of the stator facing the magnetic air gap. The magnetic characteristics of the first permanent magnet in the rotor are a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range. The magnetic characteristics of the second permanent magnet in the rotor are a coercive force larger than that of the first permanent magnet and a remanent flux density of 0.6 T or over. The product of the coercive force and magnetizing direction thickness of the first permanent magnet is equal to or larger than the product of the field strength and magnetizing direction thickness of the second permanent magnet at a no-load operating point. With this configuration, a magnetic field created by a current of the armature coil at a magnetic pole magnetizes the first permanent magnet so as to irreversibly change a flux amount of the first permanent magnet.

Another aspect of the present invention provides a method of assembling the permanent-magnet-type rotating electrical machine of the above-mentioned configuration, including inserting the rotor into the inside of the stator in a magnetized state that flux by the first permanent magnet and flux by the second permanent magnet are oppositely oriented at the magnetic pole or the magnetic air gap.

Still another aspect of the present invention provides a method of disassembling the permanent-magnet-type rotating electrical machine of the above-mentioned configuration, including pulling out the rotor from the inside of the stator in a magnetized state that flux by the first permanent magnet and flux by the second permanent magnet are oppositely oriented at the magnetic pole or the magnetic air gap.

Still another aspect of the present invention provides a permanent magnet motor drive system including a permanent magnet motor using permanent magnets, an inverter to drive the permanent magnet motor, and a magnetizing unit to pass a magnetizing current for controlling fluxes of the permanent magnets. The permanent magnet motor includes a rotor with first and second permanent magnets of different magnetic characteristics embedded in a rotor core symmetrically with respect to a rotation center, a stator arranged to surround the rotor with a magnetic air gap interposing between them, and an armature coil formed on an inner circumferential part of the stator facing the magnetic air gap. The magnetizing unit passes for a short time a d-axis current of the armature coil of the permanent magnet motor, to generate a magnetic field that magnetizes the first permanent magnet at each magnetic pole so as to irreversibly change a flux amount of the permanent magnet. Further, the magnetizing unit changes the current phase of a current passed to the armature coil, to pass a magnetizing current. The magnetic characteristics of the first permanent magnet in the rotor are a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range. The magnetic characteristics of the second permanent magnet in the rotor are a coercive force larger than that of the first permanent magnet and a remanent flux density of 0.6 T or over. The product of the coercive force and magnetizing direction thickness of the first permanent magnet is equal to or larger than the product of the field strength and magnetizing direction thickness of the second permanent magnet at a no-load operating point. The first and second permanent magnets that form the magnetic pole are arranged and magnetized so that fluxes thereof become additive to each other. A magnetic field is formed by a current of the armature coil, to magnetize the first permanent magnet and irreversibly reduce linkage flux produced by the permanent magnets. After the reduction, a magnetic field is oppositely formed by a current of the armature coil, to magnetize the first permanent magnet and irreversibly increase an amount of the linkage flux.

The permanent-magnet-type rotating electrical machine provided by the present invention is capable of conducting variable-speed operation in a wide range from low speed to high speed, realizing high torque in a low rotation speed zone and high output in middle and high rotation speed zones, improving efficiency, reliability, and productivity, and reducing materials, in particular, rare materials.

The methods of assembling and disassembling the permanent-magnet-type rotating electrical machine of the present invention insert the rotor into the inside of the stator, or pull out the rotor from the stator. The methods carry out the assembling or the disassembling in a magnetized state that flux by the first permanent magnet and flux by the second permanent magnet are oppositely oriented at the magnetic pole or the magnetic air gap. Namely, the methods carry out the assembling or the disassembling with a magnetic attraction force that attracts the rotor to the stator weakened. The assembling work or the disassembling work is easily carried out without using large jigs that resist against the magnetic attraction force.

The permanent magnet motor drive system of the present invention is capable of conducting variable-speed operation in a wide range from low speed to high speed and realizing high torque in a low rotation speed zone and high output and high efficiency in middle and high rotation speed zones.

BEST MODE OF IMPLEMENTING INVENTION

Embodiments of the present invention will be explained in detail with reference to the drawings. Although each of the below-mentioned embodiments exemplarily shows a four-pole permanent-magnet-type rotating electrical machine, any other number of poles is adoptable.

[First Embodiment]
(Permanent-Magnet-Type Rotating Electrical Machine)

Figure 1:
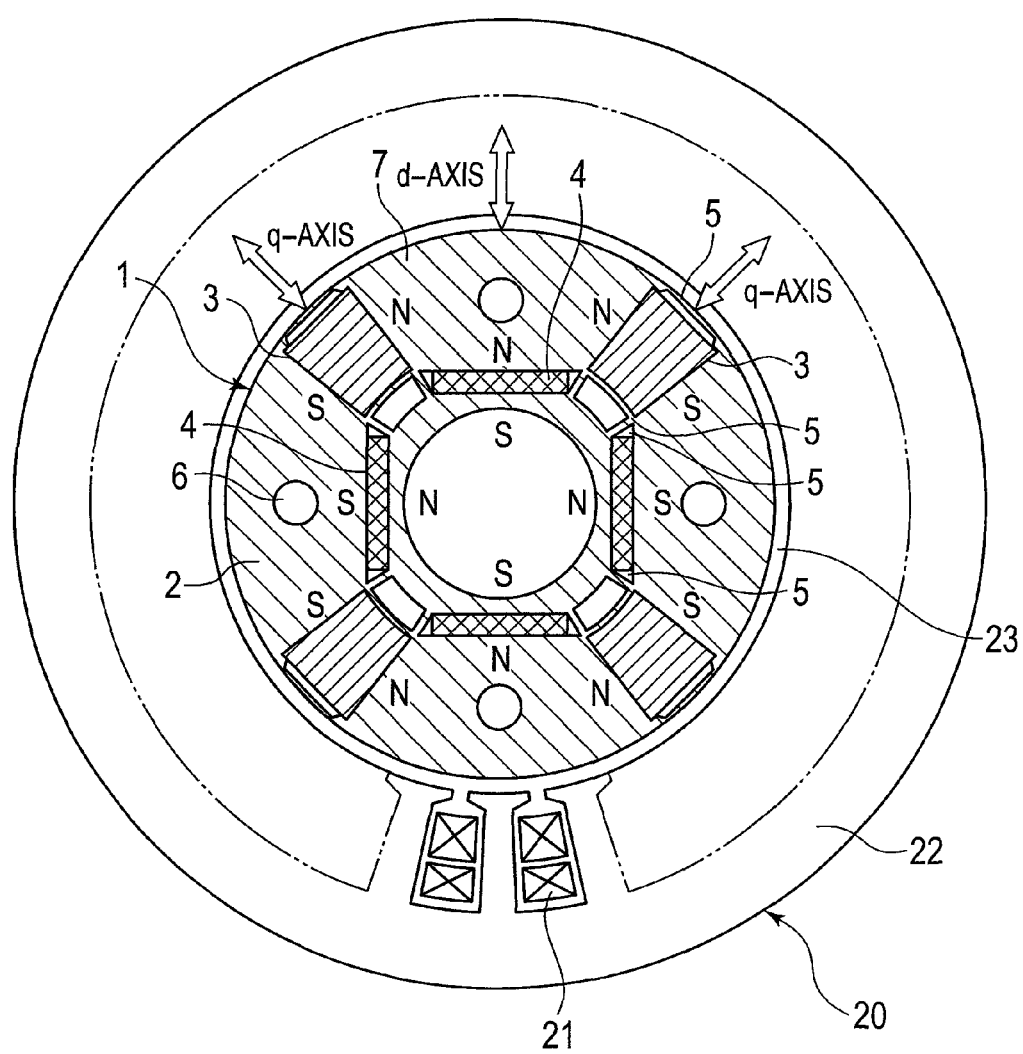
FIG. 1 is a sectional view of a permanent-magnet-type rotating electrical machine according to a first embodiment of the present invention.
Figure 20:
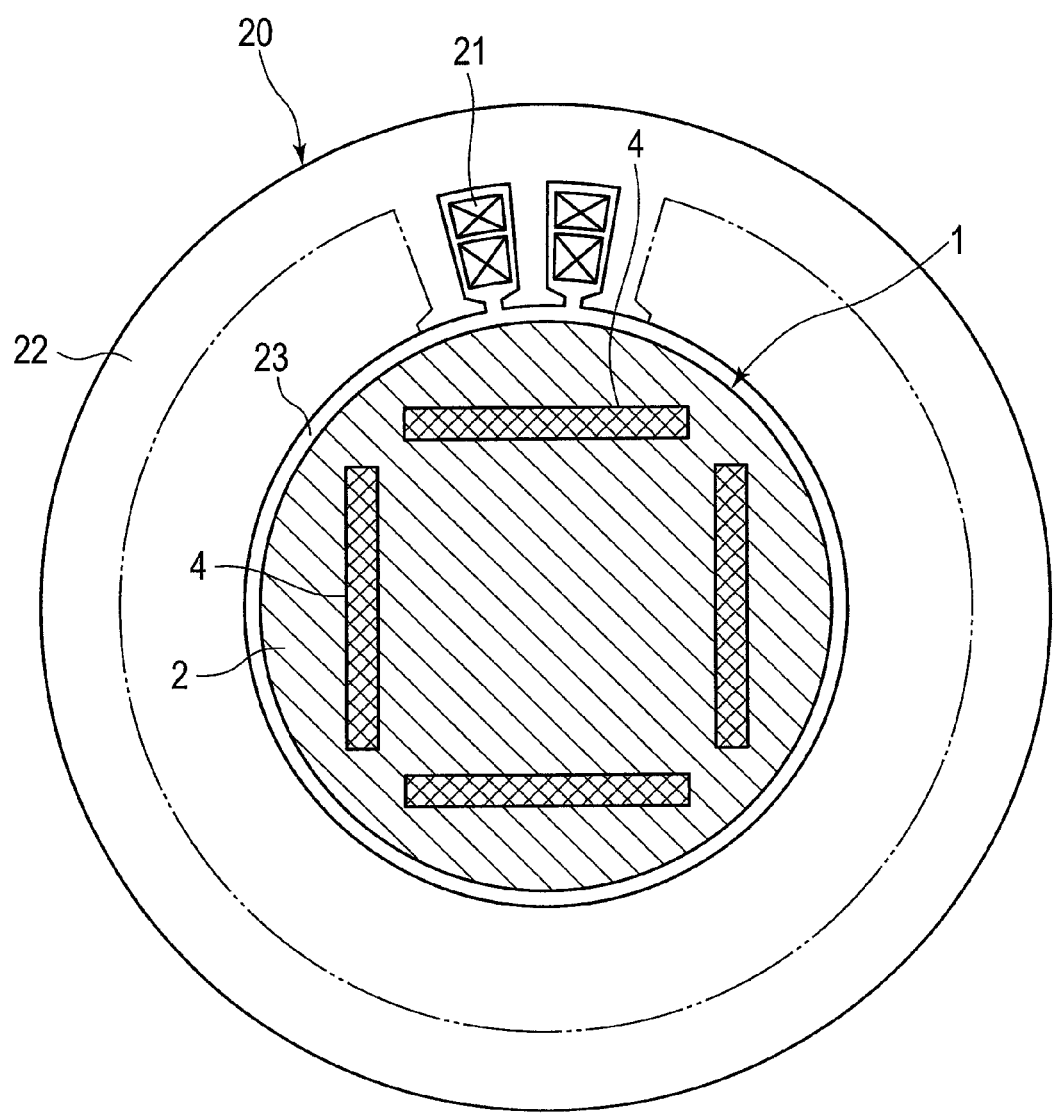
FIG. 20 is a sectional view of a conventional internal permanent magnet motor.

With reference to FIGS. 1 to 6, the permanent-magnet-type rotating electrical machine according to the first embodiment of the present invention will be explained. FIG. 1 illustrates a structure of the permanent-magnet-type rotating electrical machine according to the embodiment. Inside a stator 20, a rotor 1 is accommodated to face the stator 20 with an air gap 23 interposing between them. The stator 20 is a conventional one and is similar to that illustrated in FIG. 20.

As illustrated in FIG. 1, the rotor 1 in the permanent-magnet-type rotating electrical machine according to the embodiment includes a rotor core 2, first permanent magnets 3 whose product of coercive force and magnetizing direction thickness is small, and second permanent magnets 4 whose product of coercive force and magnetizing direction thickness is large. The rotor core 2 is constituted by laminating silicon steel plates. The first permanent magnet 3 whose product of coercive force and magnetizing direction thickness is small is an AlNiCo magnet and four pieces thereof are embedded in diametral sections of the rotor core 2. The first permanent magnet 3 may be an FeCrCo magnet. The second permanent magnet 4 whose product of coercive force and magnetizing direction thickness is large is an NdFeB magnet and four pieces thereof are embedded in diametral sections of the rotor core 2.

The first permanent magnet 3 made of an AlNiCo magnet is arranged substantially along the diameter of the rotor 1 and a cross section thereof is trapezoidal. A magnetizing direction of the first permanent magnet 3 is substantially circumferential and an average magnetizing direction thickness thereof is 6 mm according to the embodiment (although the thickness is dependent on specifications). The second permanent magnet 4 made of an NdFeB magnet is substantially arranged in a circumferential direction and has a rectangular cross-sectional shape. A magnetizing direction of the second permanent magnet 4 is substantially diametral and a magnetizing direction thickness thereof is 2 mm according to the embodiment.

Figure 2:
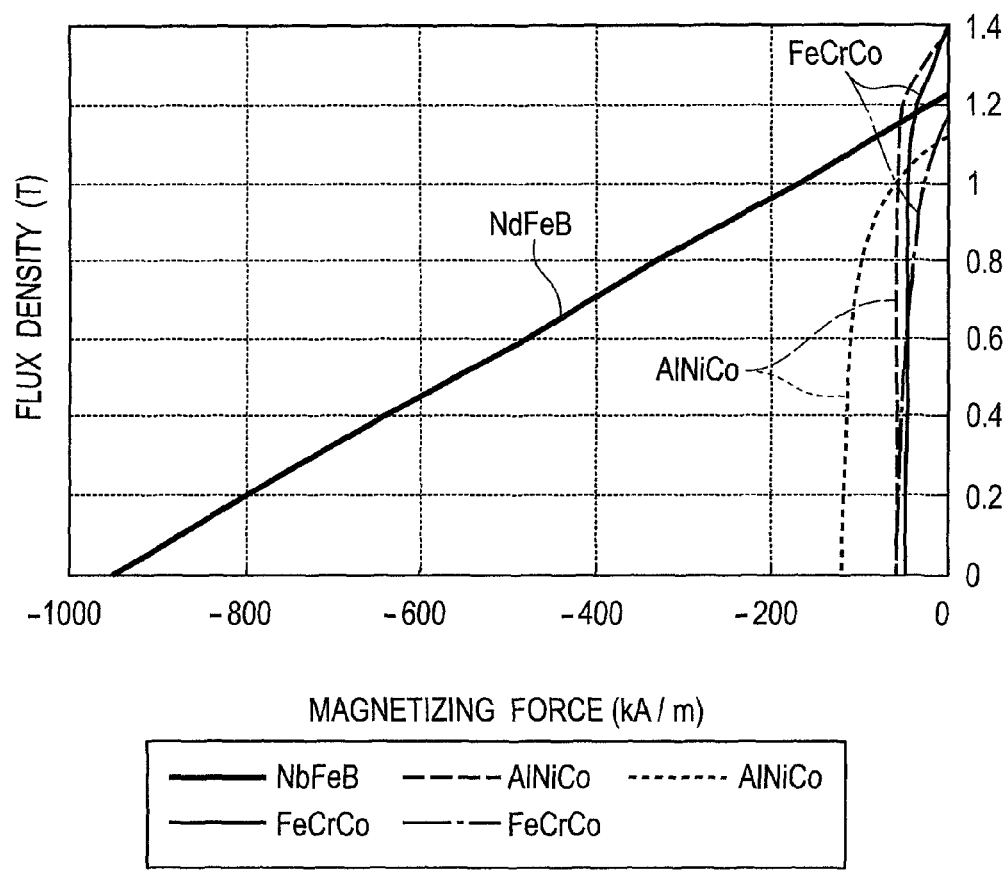
FIG. 2 is a graph of magnetic characteristics of a low-coercive-force permanent magnet and high-coercive-force permanent magnet adopted as permanent magnets of a rotor according to the above-mentioned embodiment.

FIG. 2 illustrates the magnetic characteristics of an alnico (AlNiCo) magnet used for the first permanent magnet 3 of the embodiment, an FeCrCo magnet, and an NdFeB magnet used for the second permanent magnet 4. A coercive force (a magnetic field where a flux density becomes zero) of the AlNiCo magnet is 60 to 120 kA/m and is $\frac{1}{15}$ to $\frac{1}{8}$ of a coercive force of 950 kA/m of the NdFeB magnet. A coercive force of the FeCrCo magnet is about 60 kA/m which is $\frac{1}{15}$ of the coercive force of 950 kA/m of the NdFeB magnet. It is understood that the AlNiCo magnet and FeCrCo magnet each have a coercive force fairly lower than that of the NdFeB magnet.

There is a knickpoint, i.e., a break point where a reversible magnetizing range in which flux density reversibly changes with respect to an external magnetic field changes to an irreversible magnetizing range in which flux density irreversibly changes with respect to an external magnetic field. The knickpoint of the AlNiCo magnet (AlNiCo) serving as the first permanent magnet 3 is at a position equal to or over 0.6 T and that of the FeCrCo magnet is at a position equal to or over 0.8 T. In the case of the NdFeB magnet serving as the second permanent magnet 4, no knickpoint is present in the second and fourth quadrants, and therefore, the flux density thereof reversibly changes in every zone with respect to an external magnetic field.

Magnetization of the permanent magnets according to the embodiment will be explained. In connection with the NdFeB permanent magnets 4 on a d-axis magnetic circuit, flux by a d-axis current passes between two NdFeB permanent magnets 4 (two adjacent NdFeB permanent magnets 4 having different poles), and therefore, a magnetic field by the d-axis current acts on one NdFeB permanent magnet 4 per pole. In connection with the AlNiCo permanent magnets 3, the flux by the d-axis current passes through one AlNiCo permanent magnet 3 between magnetic poles, and therefore, the magnetic field by the d-axis current acts on $\frac{1}{2}$ of the NdFeB permanent magnet 4 per pole. When evaluating the characteristics of the permanent magnets on a magnetic circuit for one pole, the magnetizing direction thickness of the AlNiCo permanent magnet 3 is considered as $\frac{1}{2}$ of the actual size thereof.

According to the embodiment, the first permanent magnet 3 whose product of coercive force and magnetizing direction thickness is small is an AlNiCo magnet having a coercive force of 120 kA/m. According to the embodiment, the AlNiCo magnet has the product of coercive force and magnetizing direction thickness of 120 kA/m×(6×10−/2) m=360 A. The second permanent magnet 4 whose product of coercive force and magnetizing direction thickness is large is an NdFeB magnet having a coercive force of 1000 kA/m. According to the embodiment, the NdFeB magnet has the product of coercive force and magnetizing direction thickness of 1000 kA/m×(2×10−3) m=2000 A. According to the embodiment, the product of coercive force and magnetizing direction thickness of the NdFeB permanent magnet 4 is 5.6 times as large as that of the AlNiCo permanent magnet 3.

As illustrated in FIG. 1, each low-coercive-force AlNiCo permanent magnet 3 is embedded in the rotor core 2. Each end of the AlNiCo permanent magnet 3 is provided with a hollow 5. The AlNiCo permanent magnet 3 is arranged in a radial direction of the rotor 1 along a q-axis serving as a center axis of an inter-pole part. An axis of easy magnetization of the AlNiCo permanent magnet 3 is substantially a circumferential direction, i.e., a direction orthogonal to the radius of the rotor 1 (in FIG. 1, a direction orthogonal to a line that halves the trapezoidal section of the AlNiCo permanent magnet 3 and passes through a rotation center).

The high-coercive-force NdFeB permanent magnet 4 is also embedded in the rotor core 2 and each end thereof is provided with a hollow 5. The NdFeB permanent magnets 4 are arranged substantially in a circumferential direction of the rotor 1 such that each NdFeB permanent magnet 4 is arranged between two AlNiCo permanent magnets 3 on an inner circumferential side of the rotor 1. An axis of easy magnetization of the NdFeB permanent magnet 4 is substantially orthogonal to the circumferential direction of the rotor 1 (in FIG. 1, a direction orthogonal to a long side of the rectangular section of the NdFeB permanent magnet 4).

Each pole core portion 7 of the rotor core 2 is surrounded by two adjacent AlNiCo permanent magnets 3 and one NdFeB permanent magnet 4. As illustrated in FIGS. 1 and 3 to 6, a center axis of the pole core portion 7 of the rotor core 2 is on the d-axis and a center axis between magnetic poles is on the q-axis. Accordingly, the AlNiCo permanent magnet 3 is arranged along the q-axis, i.e., the center axis between magnetic poles and is magnetized in a direction that forms 90° or −90° with respect to the q-axis. Concerning the adjacent AlNiCo permanent magnets 3, polar faces that face each other have the same polarity.

The NdFeB permanent magnet 4 is arranged in a direction orthogonal to the d-axis, i.e., orthogonal to the center axis of the pole core portion 7 and is magnetized in a direction that forms 0° or 180° with respect to the d-axis. Adjacent ones of the NdFeB permanent magnets 4 are oppositely polarized.

Figure 7:
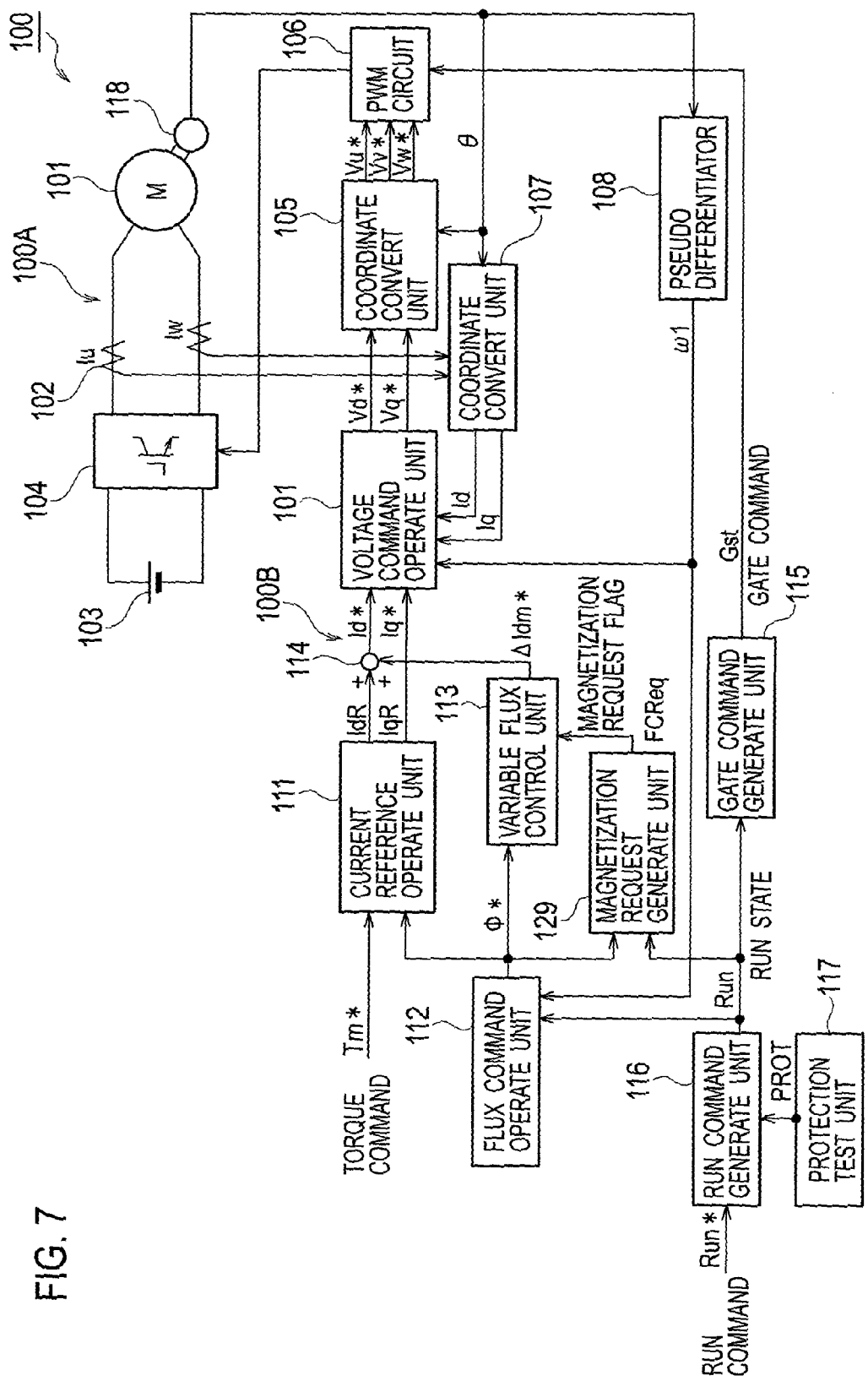
FIG. 7 is a block diagram of a permanent magnet motor drive system according to the first embodiment of the present invention.
Figure 8:
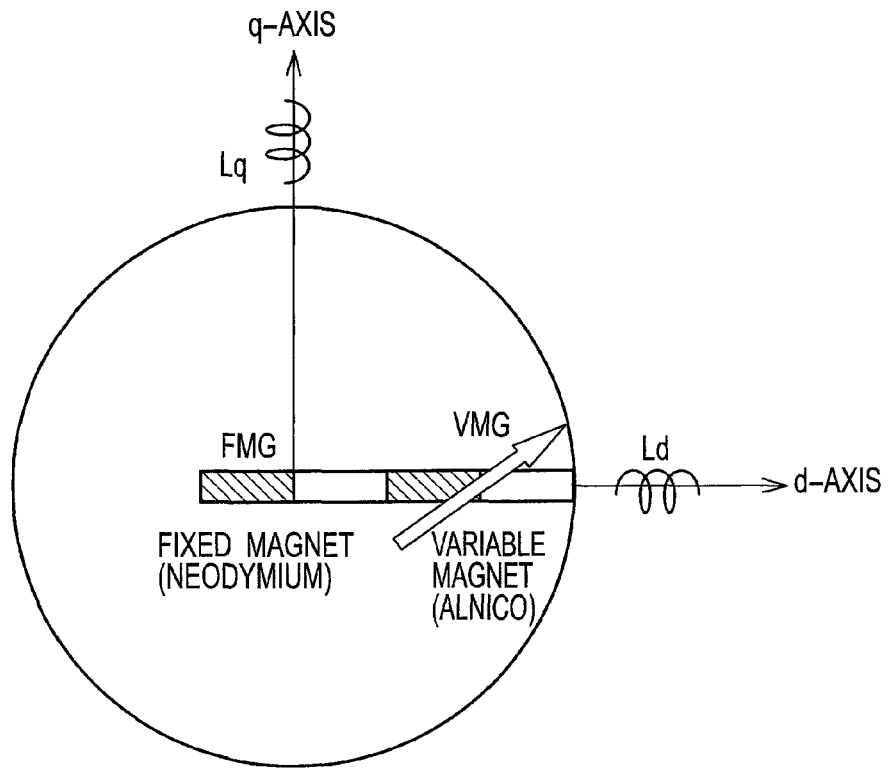
FIG. 8 is a simplified model view of a variable flux permanent magnet motor.

(Permanent magnet motor drive system) FIG. 7 is a control block diagram illustrating a permanent magnet motor drive system 100 for rotating and driving, as a motor, the permanent-magnet-type rotating electrical machine according to the first embodiment of the present invention. Before explaining the block diagram, a variable flux motor as a permanent magnet synchronous motor (PM motor) will be explained. FIG. 8 illustrates an image of the variable flux motor 101. A stator side thereof is similar to that of a conventional motor. A rotor 151 side thereof has, as permanent magnets, a fixed magnet FMG whose magnetic material has a fixed flux density and a variable magnet VMG whose magnetic material has a variable flux density. The conventional PM motor has only the former fixed magnet FMG. The variable flux motor 101 is characterized in that it has the variable magnet VMG.

Here, the fixed magnet and variable magnet will be explained. A permanent magnet keeps a magnetized state without an external current passed thereto. It is not always true even for the fixed magnet that the flux density thereof is always unchanged under any condition. Even the conventional PM motor is demagnetized when receiving an excessive current from an inverter. Namely, the permanent magnet is not a magnet whose flux amount is unchanged, but is a magnet whose flux density is almost unchanged irrespective of a current supplied by, for example, an inverter if normally operated under rated conditions. On the other hand, the variable magnet is a magnet whose flux density changes depending on a current passed from, for example, an inverter even under the above-mentioned operating conditions.

The variable magnet VMG of this sort can be designed within a certain range depending on materials and structures. For example, recent PM motors frequently employ NdFeB (neodymium) magnets having a high remanent flux density Br. The remanent flux density Br of this magnet is high, for example, about 1.2 T, and therefore, large torque can be outputted from a small apparatus. Such magnets are preferable for hybrid vehicles (HEVs) and electric trains that require high-output, small-sized motors. The conventional PM motor must not be demagnetized by normal current, and therefore, the NdFeB (neodymium) magnet having a very high coercive force Hc of about 1000 kA/m is an optimum magnet for the PM motor. This is because, for the PM motor, a magnet having a large remanent flux density and large coercive force is chosen.

Magnetic material such as AlNiCo (Hc=60 to 120 kA/m) or FeCrCo (Hc=about 60 kA/m) having a high remanent flux density and a small coercive force Hc is used for a variable magnet. With respect to a standard current amount (a current amount passed from an inverter to drive the conventional PM motor), the flux density (flux amount) of the NdFeB magnet is substantially constant, and the flux density (flux amount) of the variable magnet VMG such as the AlNiCo magnet varies. Strictly speaking, the NdFeB magnet serving as the fixed magnet FMG is used in a reversible zone, and therefore, the flux density thereof may vary in a very small range. It, however, restores an original value if the inverter current stops. On the other hand, the variable magnet VMG uses up to a non-reversible zone, and therefore, does not restore an original value even after the inverter current stops. In FIG. 8, the flux quantity of the AlNiCo magnet serving as the variable magnet VMG changes only in the d-axis direction and is substantially zero in the q-axis direction.

Figure 9:
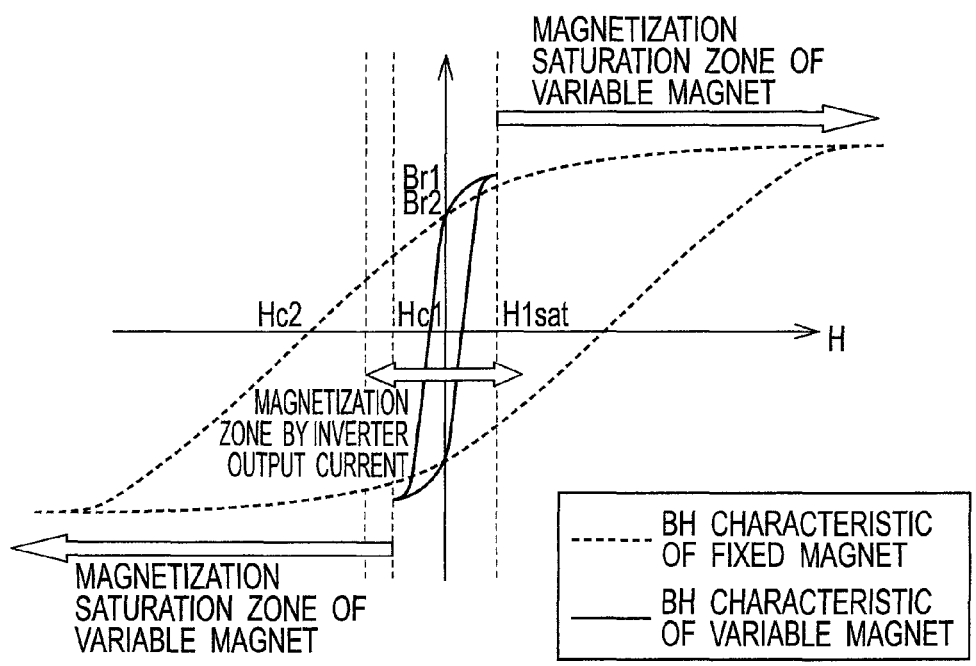
FIG. 9 is a BH characteristic diagram of the permanent-magnet-type rotating electrical machine according to the above-mentioned embodiment.
Figure 10:
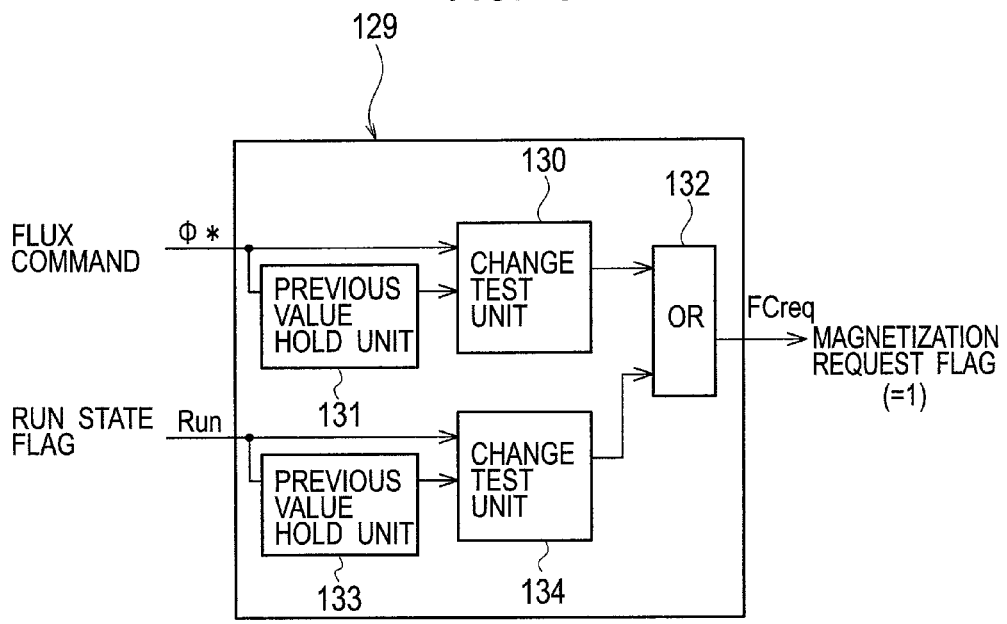
FIG. 10 is a block diagram illustrating an internal structure of a magnetization request generate unit in the permanent magnet motor drive system according to the above-mentioned embodiment.

FIG. 9 illustrates BH characteristics (flux density-magnetization characteristics) of the fixed magnet FMG and variable magnet VMG. FIG. 10 illustrates a quantitatively correct relationship only of the second quadrant of FIG. 9. In the cases of the NdFeB magnet and AlNiCo magnet, there is no significant difference between remanent flux densities Br1 and Br2. Concerning coercive forces Hc1 and Hc2, Hc1 of the AlNiCo magnet is 1/15 to 1/8 of Hc2 of the NdFeB magnet and Hc1 of the FeCrCo magnet is 1/15 of the same.

According to the conventional permanent magnet motor drive system, a magnetization zone by an output current of an inverter is sufficiently smaller than that of the coercive force of the NdFeB magnet and the NdFeB magnet is used within the reversible range of the magnetization characteristic thereof. The variable magnet, however, has a small coercive force as mentioned above, and therefore, is usable in a non-reversible zone (in which a flux density B before the application of a current is never restored even if the current is zeroed) within an output current range of the inverter. Accordingly, the variable magnet can vary a flux density (flux amount).

An equivalent simplified model of a dynamic characteristic of the variable-flux motor 1 is expressible with Math. (1). This model is a model on a dq-axes rotating coordinate system with the d-axis oriented in the direction of flux and the q-axis in a direction orthogonal to the d-axis.

[Math. 1]

$$\begin{bmatrix} Vd \\ Vq \end{bmatrix} = \frac{d}{dt} \times \begin{bmatrix} Ld & 0 \\ 0 & Lq \end{bmatrix} \times \begin{bmatrix} Id \\ Iq \end{bmatrix} + \begin{bmatrix} R1 & -\omega1 \times Lq \\ \omega1 \times Ld & R1 \end{bmatrix} \times \begin{bmatrix} Id \\ Iq \end{bmatrix} + \begin{bmatrix} 0 \\ \omega1 \times (\Phi ix + \Phi var) \end{bmatrix} \quad (1)$$

Here, R1 is a coil resistance, Ld is a d-axis inductance, Lq is a q-axis inductance, Φfix is a flux amount of the fixed magnet, Φvar is a flux amount of the variable magnet, and ω1 is an inverter frequency.

FIG. 7 illustrates a main circuit 100A and a control circuit 100B of the permanent magnet motor drive system 100 according to the first embodiment. The main circuit 100A includes a DC power source 103, an inverter 104 for inverting DC power into AC power, and the variable flux permanent magnet motor 101 driven by the AC power from the inverter 104. The main circuit 100A is provided with an AC current detector 102 to detect motor power and a speed detector 118 to detect a motor speed.

Next, the control circuit 100B will be explained. It receives a run command Run* and a torque command Tm*. A run command generate unit 116 receives the run command Run* and a protect signal PROT from a protection test unit 117 and generates and outputs a run state flag Run. Basically, the run state flag Run is set to a run state (Run=1) when the run command Run* is inputted (Run*=1). If the run command instructs a stoppage (Run*=0), the run state flag Run is set to a stop state (Run=0). If the protection test unit 117 determines that it is protective (PROT=1), the run state is set to the stop state of Run=0 even if the run command Run*=1.

A gate command generate unit 115 receives the run state flag Run and generates and outputs a gate command Gst for switching elements incorporated in the inverter 104. If the run state flag Run changes from stoppage (Run=0) to run (Run=1), the gate command generate unit 115 instantaneously sets a gate start state (Gst=1), and if the run state flag Run changes from run (Run=1) to stoppage (Run=0), sets a gate off state (Gst=0) after a predetermined time.

A flux command operate unit 112 receives the run state flag Run and the inverter frequency ω1, i.e., the rotor rotational frequency ωR and generates and outputs a flux command Φ* according to, for example, the below-mentioned expression (2). If it is a stop state (Run=0), the flux command Φ* is set to a minimum Φmin. If it is a run state (Run=1) and if the rotational frequency ωR is lower than a predetermined value, the flux command Φ* is set to a maximum Φmax. If the speed is higher than a predetermined value, the flux command Φ* is set to the minimum Φmin.

[Math. 2]

$$
\begin{aligned}
&\text{If } (\text{Run} = 0) \\
&\quad \Phi^* = \Phi\text{min} \\
&\text{Else if } (|\omega 1| < \omega A) \\
&\quad \Phi^* = \Phi\text{max} \\
&\text{Else} \\
&\quad \Phi^* = \Phi\text{min}
\end{aligned} \quad (2)
$$

Here, Φmin is a minimum flux amount (>0) to be taken by the variable-flux motor 101, Φmax is a maximum flux amount to be taken by the variable-flux motor 101, and ωA is the predetermined rotational frequency. Setting the flux amounts Φmin and Φmax will be explained later in connection with a variable flux control unit 113.

A current reference operate unit 111 receives the torque command Tm* and flux command Φ* and calculates a d-axis current reference IdR and a q-axis current reference IqR according to the following expressions (3) and (4):

[Math. 3]

$$IdR = 0 \quad (3)$$

$$IqR = Tm^*/\Phi^* \quad (4)$$

Here, the expressions (3) and (4) are operational expressions assuming that a reluctance torque of the motor is not used and the number of poles of the motor is zero. The motor may be any one of a salient motor having a difference ΔL between the d-axis inductance Ld and the Q-axis inductance Lq and a non-salient motor having no such a difference.

To optimize efficiency or maximize output with a predetermined current, the reluctance torque must be considered. In this case, the following expressions are used:

[Math. 4]

$$IqR = (-\Phi^* + \sqrt{\Phi^{*2} - 4 \times (Ld-Lq) \times K \times Tm^*})/2 \times (Ld-Lq) \times K \quad (5)$$

$$IdR = K \times IqR \quad (6)$$

Here, K is a ratio of a d-axis current to a q-axis current that may vary depending on the above-mentioned optimization of efficiency and the maximization of output. For the optimization, the expressions become functions whose arguments include torque, speed, and the like and are generally used through simple approximations or as tables. The flux command Φ* in the expression (5) is also operable with the use of an estimated flux value Φh.

FIG. 10 illustrates the details of a magnetization request generate unit 129. The block of FIG. 10 is controlled by a control microcomputer at predetermined intervals. The flux command Φ* is supplied to a previous value hold unit 131 and is held therein. An output from the previous value hold unit 131 is a flux command Φ* stored last time and is sent to a change test unit 130 together with a flux command value Φ* of this time. The change test unit 130 outputs 1 if there is a change between the two inputs and 0 if there is no change. Namely, only when the flux command Φ* changes, it outputs 1. A similar circuit configuration is prepared for the run state flag Run in place of the flux command Φ* and a flag value is supplied to and held in a previous value hold unit 133. An output from the previous value hold unit 133 is a run state flag Run stored last time and is sent together with a run state flag Run of this time to a change test unit 134. Outputs from the two change test units 130 and 134 are supplied to an OR unit 132, which provides an OR of the two inputs as a magnetization request flag FCreq.

The magnetization request flag FCreq, i.e., the output from the magnetization request generate unit 129 establishes a magnetization request (FCreq=1) if the flux command Φ* or the run state flag Run changes and no magnetization request (FCreq=0) in the other cases. The run state flag Run changes, for example, when the inverter starts to operate, or when it stops, or when it is stopped for protection. Although the embodiment employs the flux command Φ*, a change in a magnetizing current command Im* (an output from a magnetizing current table 127) of a variable flux control unit 113 to be explained later may be used to generate the magnetization request FCreq.

Figure 11:
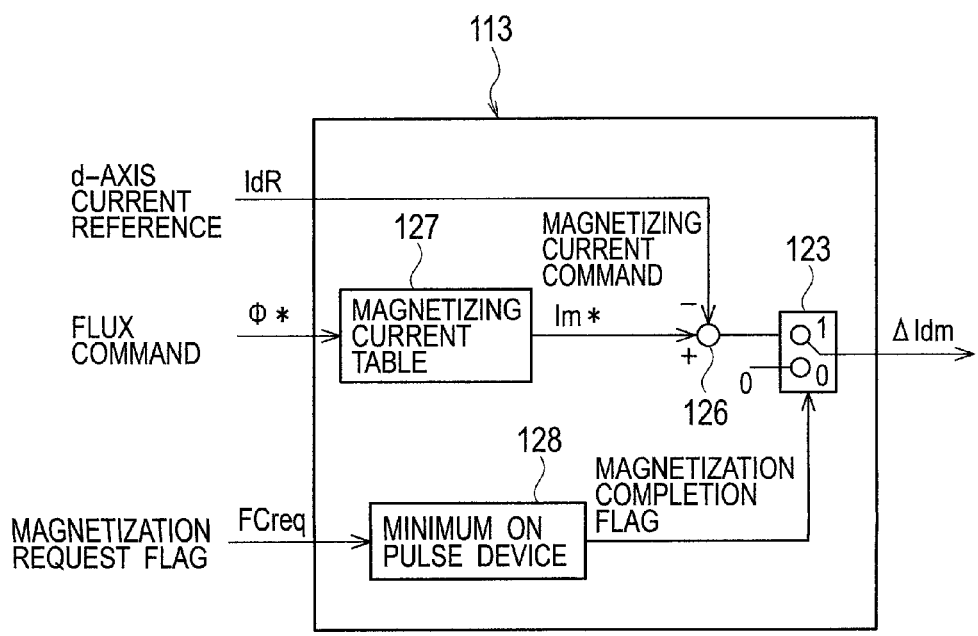
FIG. 11 is a block diagram illustrating an internal structure of a variable flux control unit in the permanent magnet motor drive system according to the above-mentioned embodiment.

FIG. 11 illustrates the details of the variable flux control unit 113. The variable flux control unit 113 receives the flux command Φ*, i.e., the output from the flux command operate unit 112 and outputs a d-axis magnetizing current difference ΔIdm* to correct the d-axis current reference IdR. The generation of the magnetizing current difference ΔIdm* is made according to the below-mentioned operation.

To magnetize the variable magnet VMG, a predetermined magnetizing current command Im* must be obtained according to the BH characteristic of the variable magnet illustrated in FIG. 9. In particular, the magnitude of the magnetizing current command Im* is set to be equal to or larger than H1sat of FIG. 9, i.e., within a magnetization saturation zone of the variable magnet.

To pass a magnetizing current up to the magnetization saturation zone, the flux amounts Φmin and Φmax set by the flux command operate unit 112 must be calculated by adding a positive or negative maximum (saturated) flux value (flux density) of the variable magnet to that of the fixed magnet. Namely, with the positive maximum flux amount (the absolute value of a negative maximum flux amount being equal to that of the positive maximum flux amount) of the variable magnet VMG being Φvarmax and the flux amount of the fixed magnet FMG being Φfix, they are expressed as follows:

[Math. 5]

$$\Phi min = \Phi fix - \Phi varmax \quad (7)$$

$$\Phi max = \Phi fix + \Phi varmax \quad (8)$$

The flux command Φ* is used to look up the magnetizing current table 127 storing corresponding magnetizing currents and output a magnetizing current command Im* for achieving the flux command Φ*.

Basically, the magnetization direction of a magnet is in the direction of the d-axis, and therefore, the magnetizing current Im* is given to a d-axis current command Id*. According to the embodiment, the d-axis current reference IdR that is an output from the current reference operate unit 111 is corrected by the d-axis magnetizing current command difference ΔIdm*, to provide the d-axis current command Id*. Accordingly, a subtracter 126 finds the d-axis magnetizing current command ΔIdm* from the following expression:

[Math. 6]

$$\Delta Idm^* = Im^* - Idr \quad (9)$$

To change flux, a configuration of directly giving the magnetizing current Im* to the d-axis current command Id* is possible.

On the other hand, the magnetization request flag FCreq for requesting to change flux becomes a switching request state (FCreq=1) at least instantaneously. To surely change flux, the magnetization request flag FCreq is inputted to a minimum ON pulse device 128, which outputs a magnetization completion flag (=1 during magnetization and =0 at the completion of magnetization). This flag has a function not to become OFF (=0) for a predetermined time once it becomes ON (=1). If the input keeps ON (=1) over the predetermined time, the output becomes OFF as soon as the input becomes OFF.

A switch 123 receives the magnetization completion flag. If it is during magnetization (magnetization completion flag =1), the switch outputs the output from the subtracter 126, and if it is the completion of magnetization (magnetization completion flag=0), 0.

According to the d- and q-axis current commands Id* and Iq* thus provided, the voltage command operate unit 110 generates d- and q-axis voltage commands Vd* and Vq* to pass currents conforming to the commands in question.

The coordinate convert unit 105 converts the d- and q-axis voltage commands Vd* and Vq* into three-phase voltage commands Vu*, Vv*, and Vw* to PWM-control the inverter 104. A coordinate convert unit 107 converts AC currents Iu and Iw detected by the current detector 102 into d- and q-axis current detected values Id and Iq, which are inputted to the voltage command operate unit 110. A pseudo differentiator 108 finds an inverter frequency ω1 from a signal from the speed detector 118. The voltage command operate unit 110, coordinate convert units 105 and 107, and PWM circuit 106 are conventional ones employing known techniques.

Figure 12:
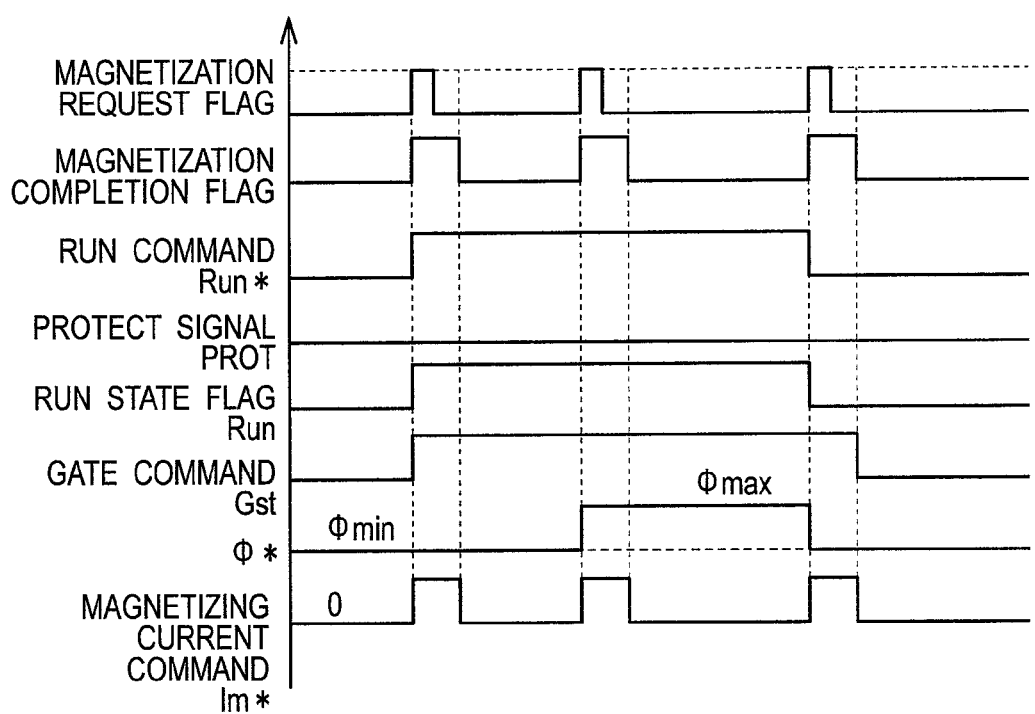
FIG. 12 is a timing chart of motor control by the permanent magnet motor drive system according to the above-mentioned embodiment.

FIG. 12 is an example of a timing chart illustrating operation of signals in a state in which the protect signal is not established (PROT=0). The run state flag Run changes and the flux command Φ* changes, to set the magnetization request flag. The magnetization completion flag keeps an ON state for a predetermined time. Only during the period of the magnetization completion flag, the magnetizing current command Im* has a value.

Next, operation of the permanent-magnet-type rotating electrical machine according to the embodiment having the above-mentioned configuration and operation of the drive system thereof will be explained. A magnetomotive force necessary for magnetization per pole is approximated by the product of a magnetic field necessary for magnetization and the thickness of a permanent magnet. The AlNiCo magnet, i.e., the first permanent magnet 3 is magnetized nearly 100% with a magnetic field of 250 kA/m. The product of the magnetizing field and the magnet thickness per pole is 250 kA/m×(6×10−3/2) m=750 A.

The NdFeB magnet, i.e., the second permanent magnet 4 is magnetized nearly 100% with a magnetic field of 1500 to 2500 kA/m. The product of the magnetizing field and the magnet thickness per pole is 1500 to 2500 kA/m×(×10−3) m=3000 to 5000 A. Accordingly, the AlNiCo permanent magnet 3 is magnetized with a magnetic field of about ¼ to ⅙ of that for the NdFeB permanent magnet 4. In a magnetic field that is sufficient to magnetize the AlNiCo permanent magnet 3, the NdFeB permanent magnet 4 is in a reversibly demagnetized state, and therefore, the NdFeB permanent magnet 4 can maintain a flux state before magnetization even after magnetization.

According to the embodiment, the armature coil 21 of the stator 20 passes a pulse current for a very short time (about 1 ms to 10 ms), to form a magnetic field that acts on the AlNiCo permanent magnets 3. The current passing time may change depending on the magnitude of a coil inductance of the rotating electrical machine and a current waveform. The pulse current that forms a magnetizing field for the permanent magnets is a d-axis current component of the armature coil 21 of the stator 20. If the magnetizing field is 250 kA/m, the magnetizing field is theoretically sufficient to magnetize the AlNiCo permanent magnets 3 and causes no irreversible demagnetization on the NdFeB permanent magnets 4.

Figure 3:
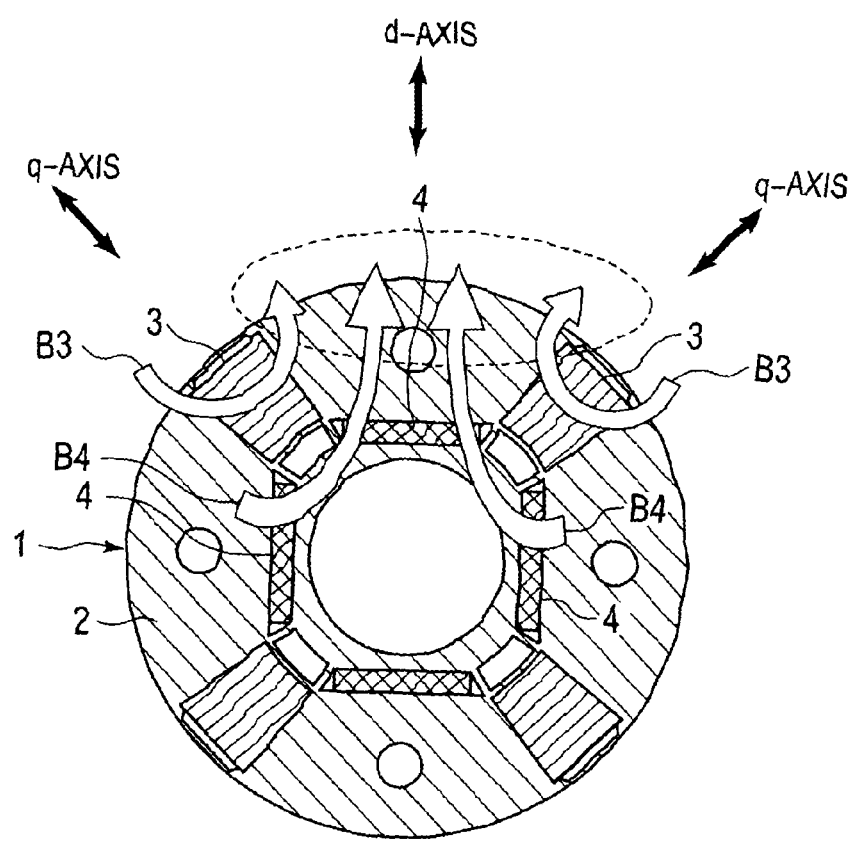
FIG. 3 is an explanatory view of flux (maximum linkage flux) of permanent magnets that have irreversibly magnetized with a d-axis current passed for a short time in the rotor of the above-mentioned embodiment.

FIG. 3 illustrates fluxes of the permanent magnets when a magnetizing field acts such that the fluxes of the AlNiCo and NdFeB permanent magnets 3 and 4 are additive at the magnetic poles and air gap face. In FIG. 3, linkage flux by the AlNiCo first permanent magnets 3 and NdFeB second permanent magnets 4 increases to establish a magnetizing state. A magnetizing field is created by passing a pulse current for a very short time through the armature coil 21 of the stator 20. The current passed at this time is a d-axis current component. The pulse current quickly becomes zero to eliminate the magnetizing field. However, the AlNiCo first permanent magnets 3 irreversibly change to generate flux B3 in the magnetizing direction. B4 is flux by the NdFeB second permanent magnets 4. Flux distributions in FIGS. 3, 4, and 5 are those related to one magnetic pole.

Figure 4:
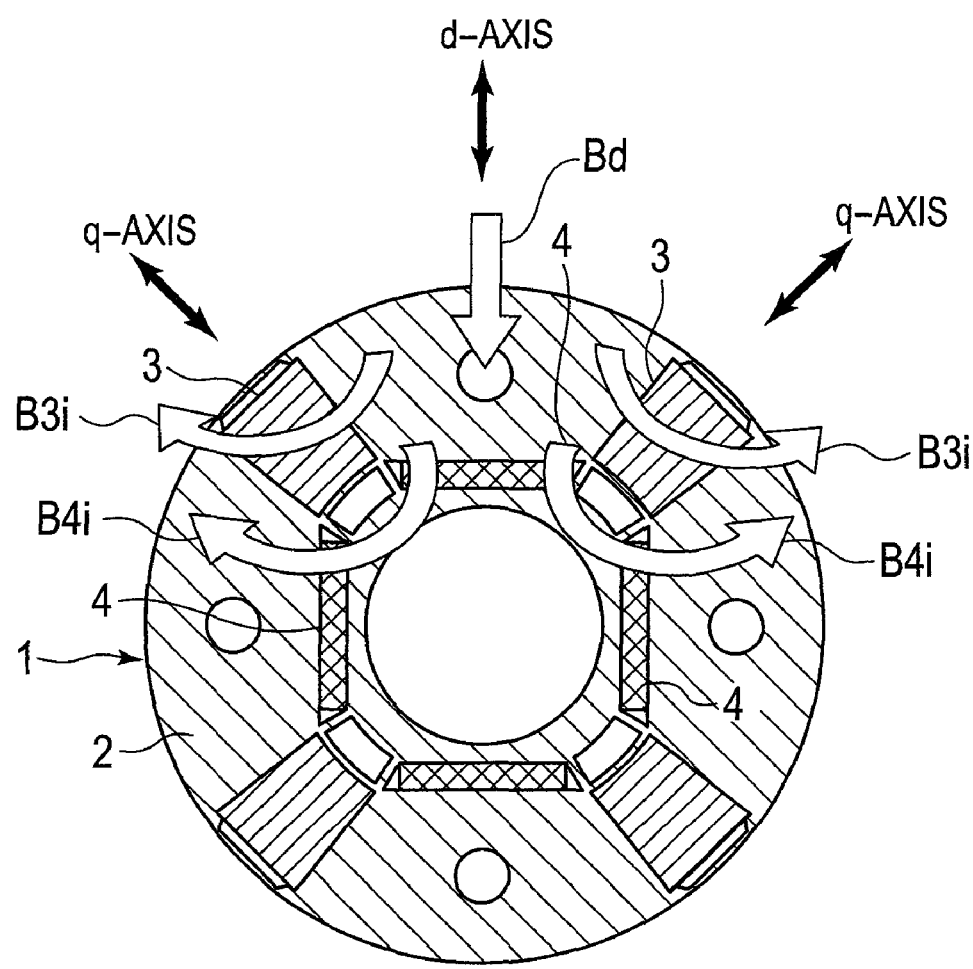
FIG. 4 is an explanatory view of flux of a demagnetizing field created by a d-axis current passed for a short time in the rotor of the above-mentioned embodiment.
Figure 5:
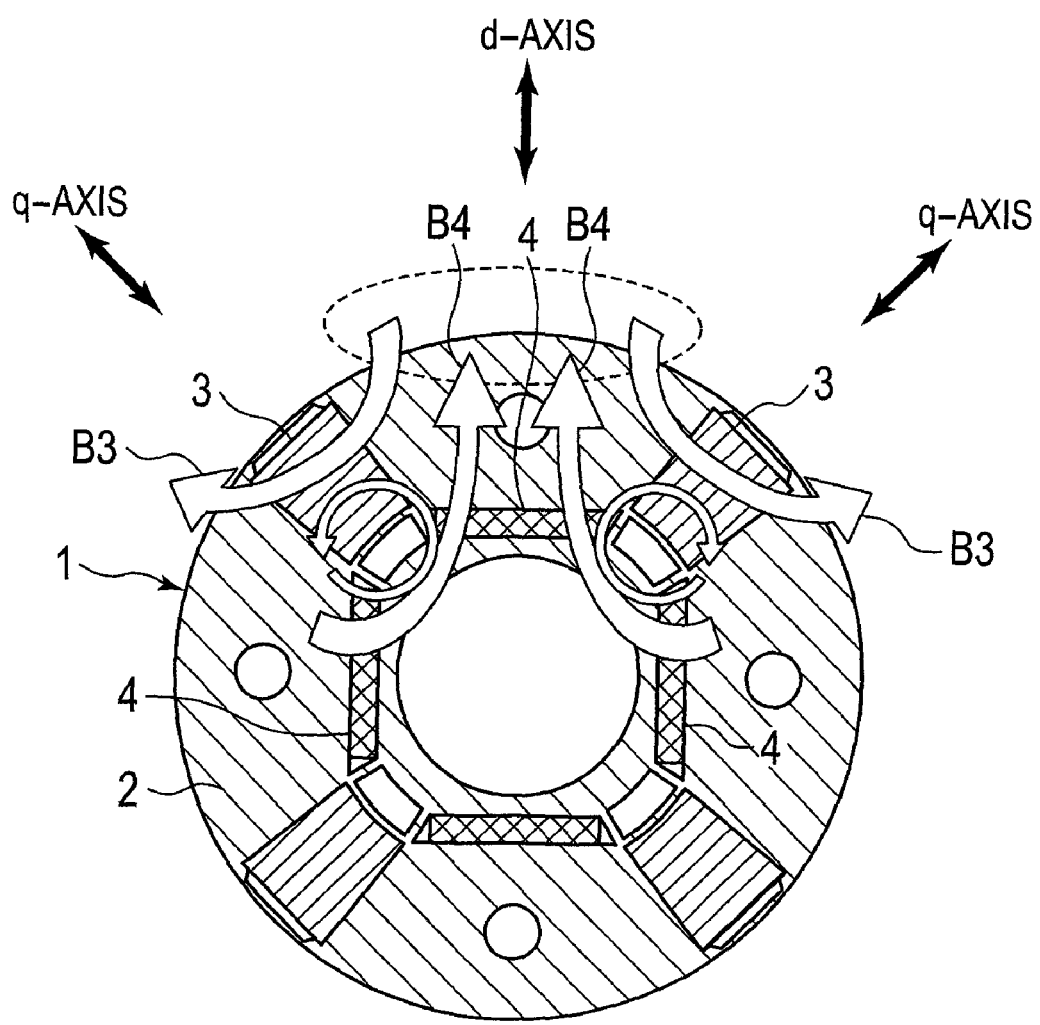
FIG. 5 is an explanatory view of flux (minimum linkage flux) of permanent magnets after the action of the demagnetizing field created by the d-axis current passed for a short time (after the annihilation of the magnetic field created by the d-axis current) in the rotor of the above-mentioned embodiment.

FIG. 4 illustrates an action to decrease linkage flux. A negative d-axis current is passed through the armature coil 21, to form a magnetic field Bd that generates fluxes in a direction opposite to the direction illustrated in FIG. 3. The magnetic field Bd created by the negative d-axis current passed to the armature coil 21 acts from the pole center of the rotor 1 toward the AlNiCo and NdFeB permanent magnets 3 and 4 opposite to the magnetizing direction. The permanent magnets 3 and 4 receive magnetic fields B3i and B4i in directions opposite to the magnetizing directions of FIG. 3. Since the AlNiCo permanent magnet 3 is small in the product of coercive force and magnetizing direction thickness, the flux of the AlNiCo permanent magnet 3 irreversibly decreases due to the opposite magnetic field. On the other hand, the NdFeB permanent magnet 4 is large in the product of coercive force and magnetizing direction thickness, and therefore, the magnetic characteristic thereof is within a reversible range even when it receives the opposite magnetic field. Accordingly, the magnetized state thereof is unchanged after the magnetizing field Bd by the negative d-axis current disappears and the flux amount thereof is also unchanged. Consequently, only the AlNiCo permanent magnets 3 are demagnetized to reduce the amount of the linkage flux.

The embodiment also passes a larger current to form a strong opposite magnetic field to reverse the polarity of the AlNiCo permanent magnets 3. Reversing the polarity of the AlNiCo permanent magnets 3 results in greatly reducing the linkage flux, even zeroing the linkage flux.

Generally, the product of magnetizing field and magnet thickness per pole of the AlNiCo magnet is about ¼ to ⅙ of that of the NdFeB magnet, and therefore, only a magnetic field that is sufficient to magnetize the AlNiCo permanent magnet 3 is generated. FIG. 5 illustrates a magnetized state established with a negative d-axis current. The flux B4 of the NdFeB permanent magnets 4 is canceled with the opposite flux B3 of the AlNiCo permanent magnets 3. If the flux amount B3 of the magnets 3 is equal to the flux amount B4 of the magnets 4, flux at the air gap 23 will nearly be zeroed. At this time, the flux B4 of the NdFeB permanent magnets 4 is cancelled and a magnetic circuit with the AlNiCo permanent magnets 3 is formed. Accordingly, the flux is mostly distributed within the rotor 1. This results in uniformly zeroing a distribution of flux at the air gap.

To increase the linkage flux from the above-mentioned linkage-flux-zero state, a d-axis current is passed to create a magnetic field to reduce the flux B3 of the AlNiCo permanent magnets 3 whose polarity is reversed in the linkage-flux-zero state. Since the polarity of the AlNiCo permanent magnets 3 is reversed, the magnetic field to act on the AlNiCo permanent magnets 3 is in the same direction as the original magnetizing direction of the AlNiCo permanent magnets 3 illustrated in FIG. 3. Namely, the direction is opposite to the direction of the magnetic field Bd created by the d-axis current illustrated in FIG. 4. To restore the original maximum linkage flux state by further increasing linkage flux, the polarity of the AlNiCo permanent magnets 3 is again reversed (returning to the original polarity) to the state of FIG. 3. In this way, in the permanent-magnet-type rotating electrical machine of the embodiment, the AlNiCo permanent magnets 3 are operated in a full range from the first quadrant to the fourth quadrant on the magnetic characteristic curve (the B-H curve representative of the flux density-magnetic field characteristic).

On the other hand, permanent magnets in the conventional permanent-magnet-type rotating electrical machine are operated only in the second quadrant. To decrease linkage flux, the conventional permanent-magnet-type rotating electrical machine passes a negative d-axis current to the armature coil 21 to create flux that cancels the flux of the second permanent magnets 4 of the rotor 1. However, in the internal magnet motor, fundamental linkage flux is reduced only to about 50% and harmonic flux substantially increases to cause the problems of harmonic voltages and harmonic iron loss. It is very difficult, therefore, to zero the linkage flux. Even if the fundamental wave is zeroed, harmonic flux increases to a fairly large level. On the other hand, in the permanent-magnet-type rotating electrical machine of the embodiment, fluxes of the permanent magnets 3 and 4 of the rotor 1 are sufficient to uniformly reduce linkage flux, to cause little harmonic flux and no increase in the loss.

In connection with magnetization of permanent magnets, a magnetic field by a d-axis current in the rotating electrical machine according to the embodiment acts on two permanent magnets (two permanent magnets at N- and S-poles) in the case of the NdFeB permanent magnets 4. In this point alone, a magnetic field acting on the NdFeB permanent magnets 4 is about a half of that acting on the AlNiCo permanent magnet 3. Accordingly, in the rotating electrical machine of the embodiment, the first permanent magnet 3 whose product of coercive force and magnetizing direction thickness is small is easily magnetized with a magnetic field by a d-axis current.

The product of magnetizing field and magnet thickness of the NdFeB permanent magnet 4 is four times as large as that of the AlNiCo permanent magnet 3. In connection with an arrangement and a structure, a magnetic field created by a d-axis current and acting on the NdFeB permanent magnet 4 is ½ of that acting on the AlNiCo permanent magnet 3. Therefore, magnetizing the NdFeB permanent magnet 4 needs a magnetomotive force eight times as large as that needed for magnetizing the AlNiCo permanent magnet 3. This means that a magnetic field that is sufficient to magnetize the AlNiCo permanent magnet 3 allows the NdFeB permanent magnet 4 to keep a reversible demagnetization state, and even after magnetization, the NdFeB permanent magnet 4 keeps magnetic flux of before magnetization.

Next, a mutual magnetic influence between the AlNiCo permanent magnet 3 and the NdFeB permanent magnet 4 will be explained. In the demagnetizing state of FIG. 5, the magnetic field of the NdFeB permanent magnets 4 acts as a biasing magnetic field on the AlNiCo permanent magnet 3. Namely, the magnetic field by the negative d-axis current and the magnetic field by the NdFeB permanent magnets 4 act on the AlNiCo permanent magnet 3, to easily magnetize the AlNiCo permanent magnet 3. The product of coercive force and magnetizing direction thickness of the AlNiCo permanent magnet 3 can be made equal to or larger than the product of magnetic field strength and magnetizing direction thickness of the NdFeB permanent magnets 4 at a no-load operating point. Then, in a linkage flux increased state, the magnetic field of the AlNiCo permanent magnet 3 overcomes the magnetic field of the NdFeB permanent magnets 4, to provide a flux amount.

As mentioned above, the rotating electrical machine of the embodiment employs a d-axis current to widely change the linkage flux amount of the AlNiCo permanent magnet 3 from a maximum to zero and magnetize the magnet in both the normal and reverse directions. If the linkage flux B4 of the NdFeB permanent magnets 4 is in the normal direction, the linkage flux B3 of the AlNiCo permanent magnet 3 is adjustable from a maximum to zero, and further, to a maximum in the reverse direction.

As a result, the permanent-magnet-type rotating electrical machine of the embodiment can magnetize the AlNiCo permanent magnet 3 with a d-axis current, to adjust the total linkage flux amount of the AlNiCo and NdFeB permanent magnets 3 and 4 in a wide range. In a low-speed zone, the AlNiCo permanent magnet 3 is magnetized with a d-axis current so that the flux thereof takes the maximum value in the same direction as the linkage flux of the NdFeB permanent magnets 4 (the magnetizing state illustrated in FIG. 3). This maximizes torque produced by the permanent magnets, and therefore, the torque and output of the rotating electrical machine are maximized. In middle- and high-speed zones, the flux amount of the AlNiCo permanent magnet 3 is irreversibly decreased to decrease the total linkage flux amount. This results in decreasing the voltage of the rotating electrical machine, to make a margin for the upper limit value of a power source voltage, thereby enabling a rotation speed (frequency) to be increased further. To extremely increase the maximum speed (to further expand a variable speed range to, for example, a range three times a base speed or higher), the AlNiCo permanent magnet 3 is magnetized in a direction opposite to the direction of the linkage flux of the NdFeB permanent magnets 4 (the flux B3 of the AlNiCo permanent magnet 3 is oriented as illustrated in FIG. 5 and the magnet 3 is magnetized to the maximum). Then, the total linkage flux of the permanent magnets 3 and 4 is the difference between the linkage flux of the NdFeB permanent magnets 4 and that of the AlNiCo permanent magnet 3. Namely, the total linkage flux is minimized. At this time, the voltage of the rotating electrical machine is also minimized, to maximize the rotation speed (frequency) thereof.

In this way, the permanent-magnet-type rotating electrical machine and the permanent magnet motor drive system for rotating and driving the same according to the embodiment can realize a variable-speed operation in a wide range at high output from low rotation speed to high rotation speed. In addition, the permanent-magnet-type rotating machine of the embodiment passes a magnetizing current for changing linkage flux only for a very short time. This results in remarkably reducing a loss and realizing high efficiency in a wide operating range.

Next, in the permanent-magnet-type rotating electrical machine and permanent magnet motor drive system according to the embodiment, demagnetization of the permanent magnets 3 and 4 due to a load current (q-axis current) at the time of torque generation will be explained. When the permanent-magnet-type rotating electrical machine of the embodiment generates torque, the armature coil 21 of the stator 20 passes a q-axis current, so that the q-axis current and the fluxes of the permanent magnets 3 and 4 cause a magnetic action to generate torque. At this time, the q-axis current creates a magnetic field. For this, the permanent-magnet-type rotating electrical machine of the embodiment arranges the AlNiCo permanent magnet 3 in the vicinity of the q-axis so that the magnetizing direction thereof becomes orthogonal to the q-axis. With this, the magnetizing direction of the AlNiCo permanent magnet 3 and the magnetic field by the q-axis current ideally become orthogonal to each other, to substantially eliminate the influence of the magnetic field by the q-axis current.

However, in a maximum torque state or in a rotating electrical machine with an armature coil of large ampere-turn for miniaturization and high output, the q-axis current, i.e., load current creates a large magnetic field. The magnetic field created by such an excessive q-axis current irreversibly demagnetizes the first permanent magnet whose product of coercive force and thickness is small and which is arranged on the rotor. Namely, the q-axis current demagnetizes the permanent magnet and reduces torque.

Figure 6:
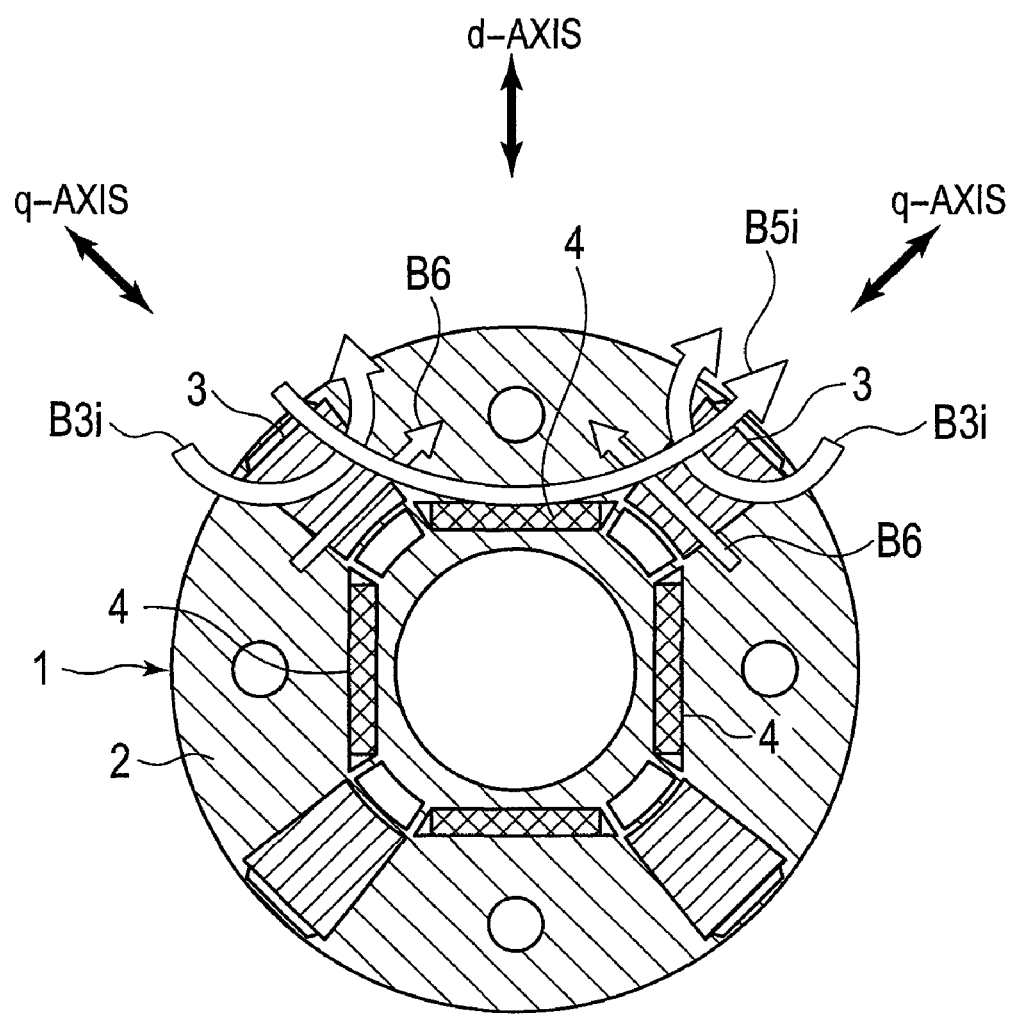
FIG. 6 is an explanatory view of a magnetic field created by a positive d-axis current and a magnetic field created by a load current (q-axis current) in the rotor of the above-mentioned embodiment.

To cope with this, the permanent-magnet-type rotating electrical machine according to the embodiment overlaps a positive d-axis current on a q-axis current when generating large torque. FIG. 6 is a model illustrating an action of a magnetic field when a positive d-axis current is overlapped at the time of torque generation. In FIG. 6, B3$i$ is the magnetic field by the positive d-axis current, B5$i$ is a magnetic field by a load current (q-axis current), and B6 is a magnetizing direction of the first permanent magnet 3 whose product of coercive force and magnetizing direction thickness is small. In a large torque range, the two kinds of permanent magnets 3 and 4 at each pole are additively oriented, and in this state, the positive d-axis current is in the same direction as the magnetizing direction of the first permanent magnet 3. Consequently, as illustrated in FIG. 6, the inside of the first permanent magnet 3 is also influenced by the magnetic field B3$i$ created by the positive d-axis current, to cancel the demagnetizing magnetic field by the q-axis current. Even with the first permanent magnet 3 whose product of coercive force and thickness is small according to the embodiment, the irreversible demagnetization of the first permanent magnet 3 is suppressed even in a large torque generating state, a torque decrease due to the magnetic field B5$i$ by the load current is suppressed, and large torque is produced.

Next, an action of the hollow 5 formed at each end of each of the permanent magnets 3 and 4 will be explained. When the permanent magnets 3 and 4 apply a centrifugal force to the rotor core 2, the hollow 5 relaxes a stress concentration on the rotor core 2, as well as a demagnetizing field. With the hollows 5 arranged as illustrated in FIG. 1, the rotor core 2 may have a curved shape to relax stress. A magnetic field created by a current tends to concentrate at each corner of the permanent magnets 3 and 4, and therefore, a demagnetizing field tends to irreversibly demagnetize the corner. The embodiment forms the hollow 5 at each end of the permanent magnets 3 and 4, to relax the demagnetizing field by a current at each corner of the permanent magnets.

Next, the structural strength of the rotor 1 according to the embodiment will be explained. The AlNiCo and NdFeB permanent magnets 3 and 4 are embedded in and held by the rotor core 2. To sufficiently resist against centrifugal force at high-speed rotation, the center of the pole core portion 7 is provided with a bolt hole 6 to fasten the rotor core 2 with a bolt to a rotor end plate and a shaft.

With the above-mentioned configuration, the permanent-magnet-type rotating electrical machine and permanent magnet motor drive system according to the embodiment provide effects mentioned below. Assuming that the linkage flux of the NdFeB permanent magnets 4 is oriented in a normal direction, the linkage flux of each AlNiCo permanent magnet 3 is adjustable in a wide range from a maximum value in the normal direction to zero to a maximum value in an opposite direction. In this way, the AlNiCo permanent magnet 3 is operated in a full range from the first quadrant to the fourth quadrant on the magnetic characteristic curve. The embodiment magnetizes the AlNiCo permanent magnets 3 with a d-axis current, to widely adjust the total linkage flux amount of the AlNiCo and NdFeB permanent magnets 3 and 4. Adjusting the total linkage flux amount of the permanent magnets results in widely adjusting the voltage of the rotating electrical machine. Magnetization is carried out by passing a pulse current for a very short time, and therefore, there is no need of always passing a flux-weakening current, to thereby greatly reduce a loss. Unlike the related art, the embodiment has no need of carrying out the flux-weakening control, and therefore, causes no harmonic iron loss due to harmonic flux.

In this way, the permanent-magnet-type rotating electrical machine and permanent magnet motor drive system according to the embodiment realize variable-speed operation at high output in a wide range from low speed to high speed and achieve high efficiency in the wide operating range. In connection with a voltage induced by the permanent magnets, each AlNiCo permanent magnet 3 is magnetized with a d-axis current to reduce the total linkage flux amount of the permanent magnets 3 and 4. This prevents the breakage of inverter electronic parts due to the induced voltage of the permanent magnets, thereby improving the reliability of the machine. When the rotating electrical machine turns under no load, the AlNiCo permanent magnets 3 are magnetized with a negative d-axis current to reduce the total linkage flux amount of the permanent magnets 3 and 4. This remarkably reduces the induced voltage, to substantially eliminate the need of always passing a flux-weakening current to decrease the induced voltage, thereby improving total efficiency. In particular, when the permanent-magnet-type rotating electrical machine of the embodiment is installed in a commuter train that involves a long coasting interval, it greatly improves the total running efficiency of the train.

According to the permanent-magnet-type rotating electrical machine and permanent magnet motor drive system of the embodiment, the second permanent magnet 4 whose product of coercive force and magnetizing direction thickness is large is an NdFeB magnet and the first permanent magnet 3 whose product of coercive force and magnetizing direction thickness is small is an AlNiCo magnet. At a maximum rotation speed ω of the rotor 1, a counter electromotive voltage generated by the second permanent magnets 4 is configured to be equal to or lower than a withstand voltage E of electronic parts of an inverter serving as a power source of the rotating electrical machine, to satisfy the condition of $\phi PM2 \leqq E/\omega \cdot N$ (N being the number of turns of the armature coil 21). This provides the below-mentioned effects. A counter electromotive voltage generated by a permanent magnet increases in proportion to a rotation speed. The counter electromotive voltage is suppressed below the withstand voltage of the inverter electronic parts or the power source voltage by always passing a d-axis current. If an uncontrollable state occurs, the counter electromotive voltage will exceed the withstand voltage of inverter electronic parts, to cause insulation breakage. To cope with this, the permanent-magnet-type rotating electrical machine according to the related art limits the counter electromotive voltage generated by permanent magnets lower than the withstand voltage. This design, however, cuts a flux amount of the permanent magnets, thereby lowering the output and efficiency of the machine in a low-speed zone. On the other hand, the embodiment passes a d-axis current for a short time at high rotation speed, to generate a magnetic field in a demagnetizing direction, thereby irreversibly magnetize the permanent magnets and reducing the linkage flux of the permanent magnets 3 and 4. The embodiment, therefore, causes no excessive counter electromotive voltage even if an uncontrollable state occurs at high rotation speed.

If an electrical short circuit occurs in the armature coil 21 and the like, a short-circuit current demagnetizes each AlNiCo permanent magnet 3 or reverses the polarity thereof, and therefore, linkage flux by the permanent magnets 3 and 4 is produced only by the NdFeB permanent magnets 4 or is zeroed at the time of the polarity reversal. Accordingly, the short-circuit current is instantaneously decreased by the rotating electrical machine itself. This prevents heat generation by braking force due to the short-circuit current or by the short-circuit current itself.

In this way, the permanent-magnet-type rotating electrical machine and permanent magnet motor drive system according to the embodiment generate high torque (high output) at low rotation speed, achieve variable-speed operation with high output in a wide range from low speed to high speed, and realize high efficiency in the wide operating range. In addition, they suppress a counter electromotive voltage at high rotation speed and improve the reliability of the drive system including an inverter.

[Second Embodiment]

The second embodiment of the present invention will be explained with reference to FIG. 1. A permanent-magnet-type rotating electrical machine according to the embodiment adopts an AlNiCo magnet as a first permanent magnet 3 having an uneven magnetizing direction thickness and a trapezoidal section as illustrated in FIG. 1.

The AlNiCo magnet has a high remanent flux density and a low coercive force, and therefore, the flux density thereof suddenly changes with respect to a magnetic field in a low flux density zone. Accordingly, finely adjusting the flux density only based on the strength of a magnetic field needs accurately controlling the strength of the magnetic field. For this, the embodiment uses that a magnetizing force needed to magnetize a permanent magnet greatly changes depending on the magnetizing direction thickness of the permanent magnet. According to the embodiment, the AlNiCo permanent magnet 3 is trapezoidal and is uneven in the magnetizing direction thickness thereof. This results in changing flux amount generated at each thickness of the permanent magnet when a magnetic field acts on the permanent magnet. Namely, the strength of a magnetizing field is made to be greatly dependent on the thickness of the permanent magnet. As a result, a flux amount with respect to a magnetic field created by a d-axis current becomes easily adjustable and variations in the flux amount due to variations in external conditions are reduced.

[Third Embodiment]

A permanent-magnet-type rotating electrical machine and permanent magnet motor drive system according to the third embodiment of the present invention will be explained. This embodiment drives the permanent-magnet-type rotating electrical machine 101 illustrated in FIG. 1 by the permanent magnet motor drive system 100 illustrated in FIG. 7 that creates a pulse-like magnetic field with a short-time d-axis current so as to irreversibly magnetize the AlNiCo permanent magnets 3 and change a linkage flux amount. The embodiment always generates flux by a negative d-axis current in a middle or high rotation speed zone, so that linkage flux consisting of the flux by the negative d-axis current and flux by the permanent magnets 3 and 4 is finely adjusted according to the flux by the negative d-axis current. Namely, in the middle or high speed zone, the pulse-like magnetic field created by the short-time d-axis current irreversibly changes the magnetized state of the AlNiCo permanent magnets 3, thereby greatly changing a linkage flux amount, and the negative d-axis current that is always passed finely adjusts the linkage flux amount. At this time, the linkage flux amount finely adjusted by the negative d-axis current that is always passed is very small, and therefore, the always-passed negative d-axis current is too small to cause a large loss.

The permanent-magnet-type rotating electrical machine according to the embodiment is capable of widely changing a linkage flux amount that is a basis of voltage, finely adjusting the linkage flux amount, and efficiently changing the same.

[Fourth Embodiment]

A permanent-magnet-type rotating electrical machine according to the fourth embodiment of the present invention will be explained with reference to FIG. 13. The structure of a stator 20 of the embodiment is similar to that of the first embodiment illustrated in FIG. 1 or that of the related art illustrated in FIG. 20.

Figure 13:
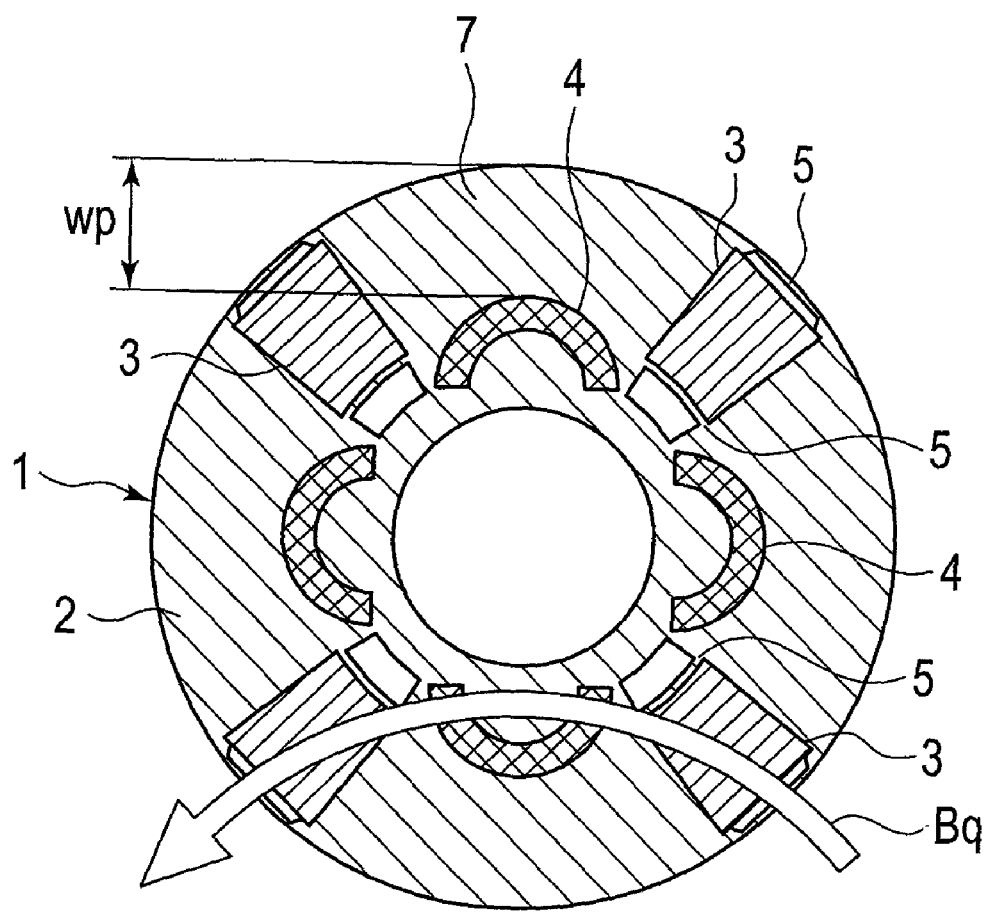
FIG. 13 is an explanatory view of a section of a rotor and flux in a permanent-magnet-type rotating electrical machine according to a fourth embodiment of the present invention.

As illustrated in FIG. 13, a rotor 1 of this embodiment embeds NdFeB permanent magnets 4 in a rotor core 2, each NdFeB permanent magnet 4 having an inverted U-shape whose center axis is on a d-axis. Each AlNiCo permanent magnet 3 is arranged inside the rotor core 2 along a q-axis in a diametral direction. Having the inverted U-shape, the NdFeB permanent magnet 4 can expand a magnetic pole area in a region between two AlNiCo permanent magnets 3. In addition, the inverted U-shape NdFeB permanent magnet 4 is arranged to block a magnetic path Bq of q-axis flux. This results in reducing a q-axis inductance, thereby improving a power factor. A distance Wp between an outer end (central part) of the inverted U-shape NdFeB permanent magnet 4 and an outer circumference (air gap face) of the rotor core 2 is so set not to be magnetically saturated with flux of the AlNiCo and NdFeB permanent magnets 3 and 4. By setting a flux density at a central part of a pole core portion 7 at about 1.9 T, a flux distribution of the air gap will not be distorted, and therefore, flux of each permanent magnet can effectively be used.

[Fifth Embodiment]

A permanent-magnet-type rotating electrical machine according to the fifth embodiment of the present invention will be explained with reference to FIG. 14. The structure of a stator 20 in the permanent-magnet-type rotating electrical machine of the embodiment is the same as that of the first embodiment illustrated in FIG. 1 or that of the related art illustrated in FIG. 20.

Figure 14:
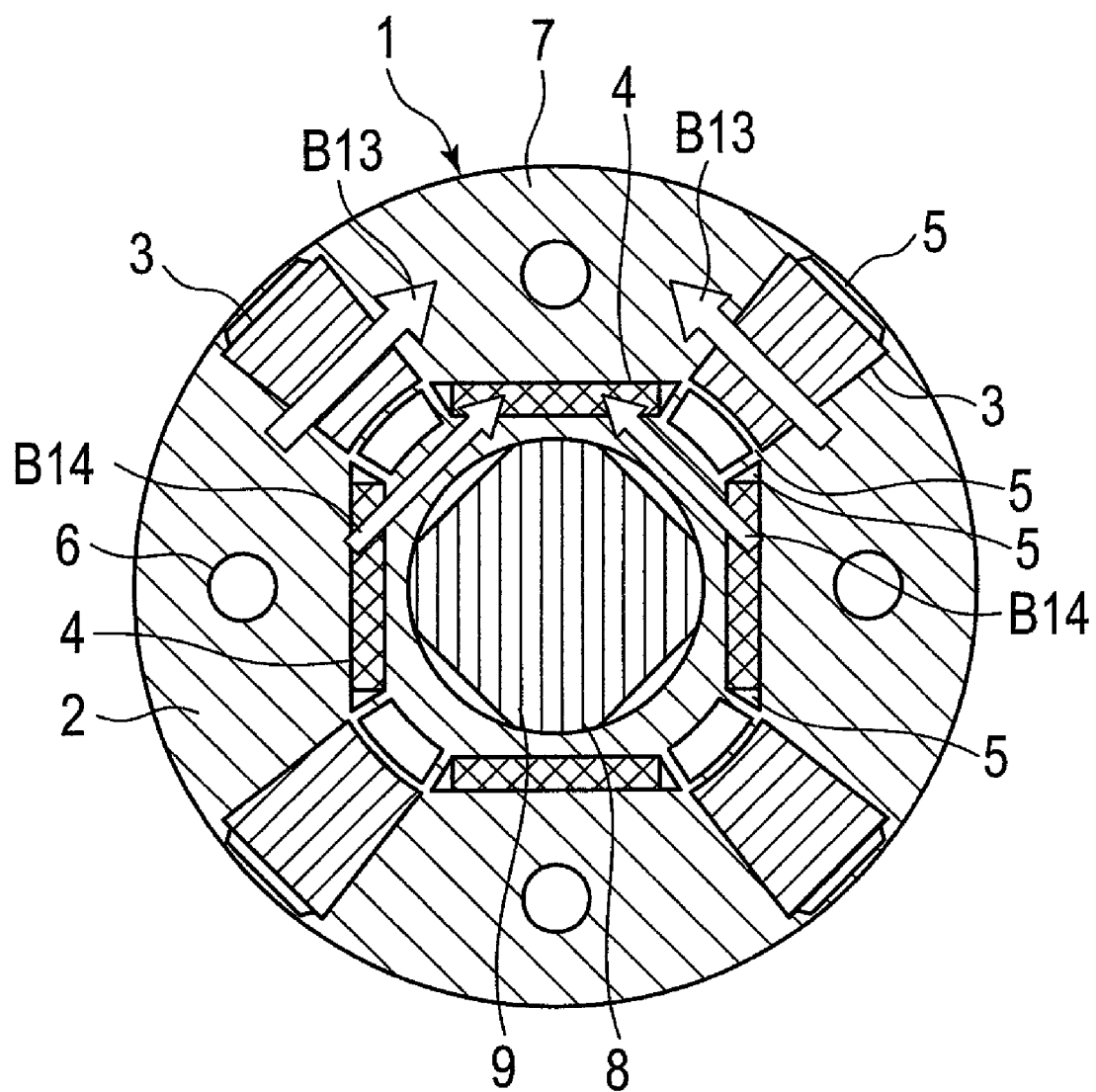
FIG. 14 is a sectional view of a rotor in a permanent-magnet-type rotating electrical machine according to a fifth embodiment of the present invention.

As illustrated in FIG. 14, a rotor 1 of this embodiment arranges each AlNiCo first permanent magnet 3 inside a rotor core 2 along a q-axis in a diametral direction and each NdFeB second permanent magnet 4 inside the rotor core 2 in a circumferential direction orthogonal to a d-axis. An inner circumferential side of the rotor core 2 of the rotor 1 is engaged with an iron shaft 9. The shaft 9 has four cut faces to form an air layer 8 between the rotor core 2 and the shaft 9. The shaft 9 may be made of nonmagnetic material such as stainless steel.

An armature coil 21 passes a current to generate a magnetic field for magnetizing the permanent magnets. The magnetic field acts on the AlNiCo and NdFeB permanent magnets 3 and 4, to form fluxes indicated with arrows B13 and B14 in FIG. 14. The fluxes created by the current do not pass through the shaft 9 because of the air layer 8 but pass through a narrow iron core part on the inner circumferential side between the NdFeB permanent magnets 4. This narrow iron core part, however, easily magnetically saturates, to reduce the flux that is generated by the magnetic field created by the armature current and passes through the NdFeB permanent magnets 4.

As a result, the flux of the AlNiCo permanent magnets 3 that must be magnetized increases, and at the same time, the flux of the NdFeB permanent magnets 4 decreases to relax the magnetic saturation of pole core portions 7 and a stator core 22. This results in reducing a d-axis current necessary for magnetizing the AlNiCo permanent magnets 3. The shaft 9 made of nonmagnetic material decreases flux leakage to the shaft 9, to further reduce the flux passing through each NdFeB magnet 4 and further relax the magnetic saturation of the pole core portions 7 and stator core 22.

[Sixth Embodiment]

A permanent-magnet-type rotating electrical machine according to the sixth embodiment of the present invention will be explained. This embodiment adopts, in the permanent-magnet-type rotating electrical machine of the first to fifth embodiments, an NdFeB magnet containing little Dy element as the second permanent magnet 4 whose product of coercive force and magnetizing direction thickness is large. With little Dy element, the permanent magnet has a high remanent flux density of 1.33 T or over at 20° C.

At high speed, the rotating electrical machine of the related art carries out the flux-weakening control with a negative d-axis current to suppress a voltage increase due to an induced voltage. At this time, an excessive counter magnetic field acts on the permanent magnets so that the permanent magnets are irreversibly demagnetized to greatly reduce output. To cope with this, the related art employs NdFeB magnets having a large coercive force. To increase the coercive force of the NdFeB magnets, Dy element is added. This, however, lowers the remanent flux density of the permanent magnets to decrease the output of the rotating electrical machine. Also, only to improve an ability to resist against demagnetization, the magnetizing direction thickness of each NdFeB magnet must be increased.

The permanent-magnet-type rotating electrical machine of the embodiment irreversibly magnetizes the AlNiCo permanent magnets 3, to adjust a linkage flux amount that generates a voltage. Accordingly, the embodiment conducts no flux-weakening control that applies an excessive magnetic field to the NdFeB permanent magnets 4. The embodiment may use the weakening control for a fine adjustment, although a current used for this is very small to minimize a counter magnetic field. Namely, the NdFeB magnets employed by the permanent-magnet-type rotating electrical machine of the embodiment may be of a low coercive force and a high remanent flux density, this sort of NdFeB magnets being not adoptable by the rotating electrical machine of the related art due to demagnetization. Such NdFeB magnets can increase an air gap flux density and provide high output.

For example, the NdFe magnets adopted by the rotating electrical machine of the related art have a coercive force Hcj of 2228 kA/m and a remanent flux density Br of 1.23 T. On the other hand, the NdFeB magnets employed by the embodiment have Hcj=875 kA/m and a remanent flux density Br of 1.45 T. In this way, the coercive force of the embodiment is small but the flux density thereof is 1.17 times larger than that of the related art. Namely, the embodiment is expected to provide output about 1.17 times larger than that of the related art.

The rotating electrical machine of the related art increases, without contributing to the output thereof, a magnet thickness only for resisting against demagnetization. On the other hand, the permanent-magnet-type rotating electrical machine of the embodiment involves a small demagnetizing field, and therefore, can reduce the quantity of use of the NdFeB magnets. The embodiment can employ NdFeB magnets containing substantially no Dy element that is a rare material, and therefore, can stably be manufactured in the future.

[Seventh Embodiment]

In a permanent-magnet-type rotating electrical machine according to the seventh embodiment of the present invention, a rotor 1 employs an NdFeB magnet as a second permanent magnet 4 whose product of coercive force and magnetizing direction thickness is large and an AlNiCo magnet as a first permanent magnet 3 whose product of coercive force and magnetizing direction thickness is small. A counter electromotive voltage generated by the NdFeB permanent magnet 4 at a maximum rotation speed is set to be equal to or lower than a withstand voltage of inverter electronic parts in a power source of the rotating electrical machine.

A counter electromotive voltage generated by a permanent magnet increases in proportion to a rotation speed. The counter electromotive voltage is applied to electronic parts of an inverter, and if it exceeds a withstand voltage of the inverter electronic parts, the parts will break. To cope with this, the permanent-magnet-type rotating electrical machine according to the related art is designed so that a counter electromotive voltage to be generated by permanent magnets does not exceed a withstand voltage of electronic parts. This design, however, cuts a flux amount of each permanent magnet, thereby lowering the output and efficiency of the machine in a low-speed zone.

To cope with this, the embodiment irreversibly magnetizes, at high-speed rotation, the permanent magnets with a demagnetizing field created by a negative d-axis current, thereby nearly zeroing flux of the AlNiCo permanent magnets 3. Since a counter electromotive voltage by the AlNiCo permanent magnets 3 can nearly be zeroed, it is only needed to make a counter electromotive voltage generated at a maximum rotation speed by the NdFeB permanent magnets 4 whose flux amount is not adjustable lower than the withstand voltage of electronic parts. Namely, only the flux amount of the NdFeB permanent magnets 4 must be reduced not to reach the withstand voltage. On the other hand, at low-speed rotation, a linkage flux amount of the AlNiCo permanent magnets 3, which are magnetized to the maximum, and the NdFeB permanent magnets 4 can be increased.

In practice, in a maximum speed zone, each AlNiCo permanent magnet 3 is magnetized oppositely to that in a low-speed zone. Accordingly, the total linkage flux amount becomes lower than the linkage flux amount of the NdFeB permanent magnets 4 alone. Namely, according to the rotating electrical machine of the embodiment, a counter electromotive voltage at high speed becomes lower than that of the NdFeB permanent magnets 4 alone, so that a withstand voltage and an allowable maximum rotation speed may actually have sufficient margins.

As a result, the rotating electrical machine of the embodiment can maintain high output and high efficiency at low-speed rotation, suppress a counter electromotive voltage at high-speed rotation, and improve the reliability of the system including the inverter.

[Eighth Embodiment]

Figure 15:
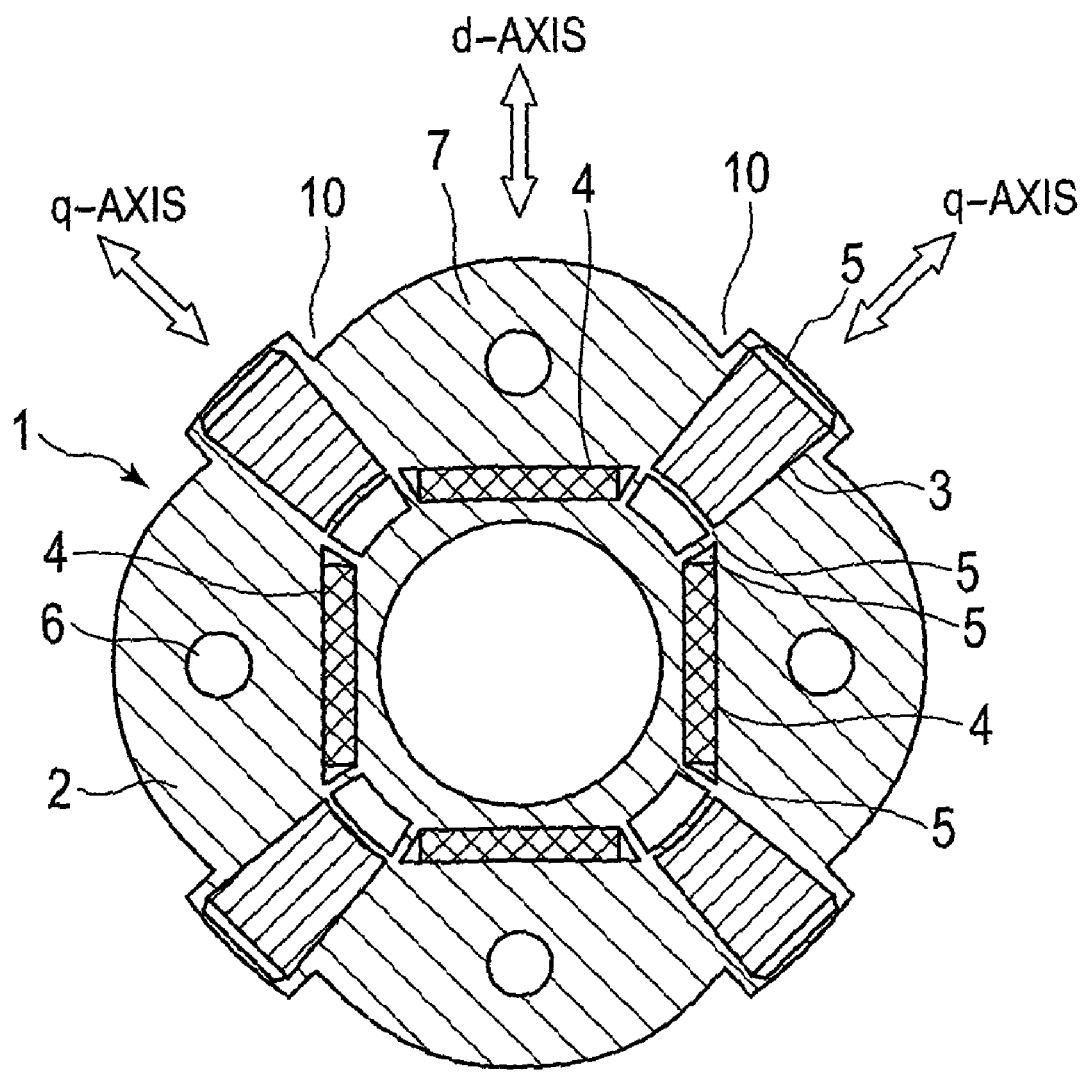
FIG. 15 is a sectional view of a rotor in a permanent-magnet-type rotating electrical machine according to an eighth embodiment of the present invention.

The eighth embodiment of the present invention will be explained with reference to FIG. 15. The structure of a stator 20 of the embodiment is similar to that of the first embodiment illustrated in FIG. 1 or that of the related art illustrated in FIG. 20.

According to a permanent-magnet-type rotating electrical machine of the embodiment, a rotor 1 arranges AlNiCo permanent magnets 3 inside a rotor core 2 in a radial direction of the rotor 1 that agrees with a q-axis serving as an inter-pole center axis. Except for a part of the rotor core 2 at each end of the AlNiCo permanent magnet 3, an outermost circumference of the rotor core 2 around the q-axis on an air gap side is recessed, to form recesses 10.

Operation of the permanent-magnet-type rotating electrical machine of the embodiment will be explained. Flux (d-axis flux) created by a d-axis current crosses the AlNiCo and NdFeB magnets 3 and 4. The magnetic permeability of the permanent magnets is substantially equal to that of air, and therefore, a d-axis inductance is small. On the other hand, flux in a q-axis direction passes through a pole core portion 7 of the rotor core in longitudinal directions of the AlNiCo and NdFeB permanent magnets 3 and 4. The magnetic permeability of the pole core portion 7 of the core is 1000 to 10000 times as large as that of the permanent magnets. If the q-axis part of the rotor core 2 has no recess and if the outer diameter of the rotor core 2 is circumferentially uniform, a q-axis inductance will be large. A q-axis current must be passed to produce magnetic action and flux to generate torque. At this time, the large q-axis inductance increases a voltage generated by the q-axis current. Namely, the large q-axis inductance deteriorates a power factor.

The embodiment recesses the outermost circumference of the rotor core 2 around the q-axis on an air gap side, to form the recesses 10 that decrease flux passing through the recesses 10. Since the recesses 10 are present in the q-axis direction, they can reduce the q-axis inductance. This results in improving the power factor. Since the recesses 10 decrease the q-axis inductance, negative reluctance torque caused when a positive d-axis current is passed decreases. When the recesses 10 are enlarged to decrease the q-axis inductance lower than the d-axis inductance, the positive d-axis current creates positive reluctance torque to increase total torque that is the sum of magnet torque and reluctance torque. Each recess 10 equivalently elongates an air gap length around each end of the AlNiCo permanent magnet 3, to lower an average magnetic field around the end of the AlNiCo permanent magnet 3. This results in reducing the influence of a demagnetizing field on the AlNiCo permanent magnet 3 due to the q-axis current for generating torque.

Between the end of the AlNiCo permanent magnet 3 and the middle of the pole core portion 7 of the rotor, the middle of the pole core portion 7 on the d-axis defines an outermost peripheral part. The distance between the axial center of the rotor and the outer circumference of the rotor core decreases from the middle of the pole core portion 7 toward the end of the AlNiCo permanent magnet 3 on the outer circumferential side of the rotor core.

With this, the embodiment can reduce the q-axis inductance and suppress the demagnetization of the AlNiCo permanent magnets 3 due to the q-axis current. The recesses 10 smoothly incline along the outer circumference of the rotor, to reduce harmonic flux, torque ripple, and cogging torque.

[Ninth Embodiment]

Figure 16:
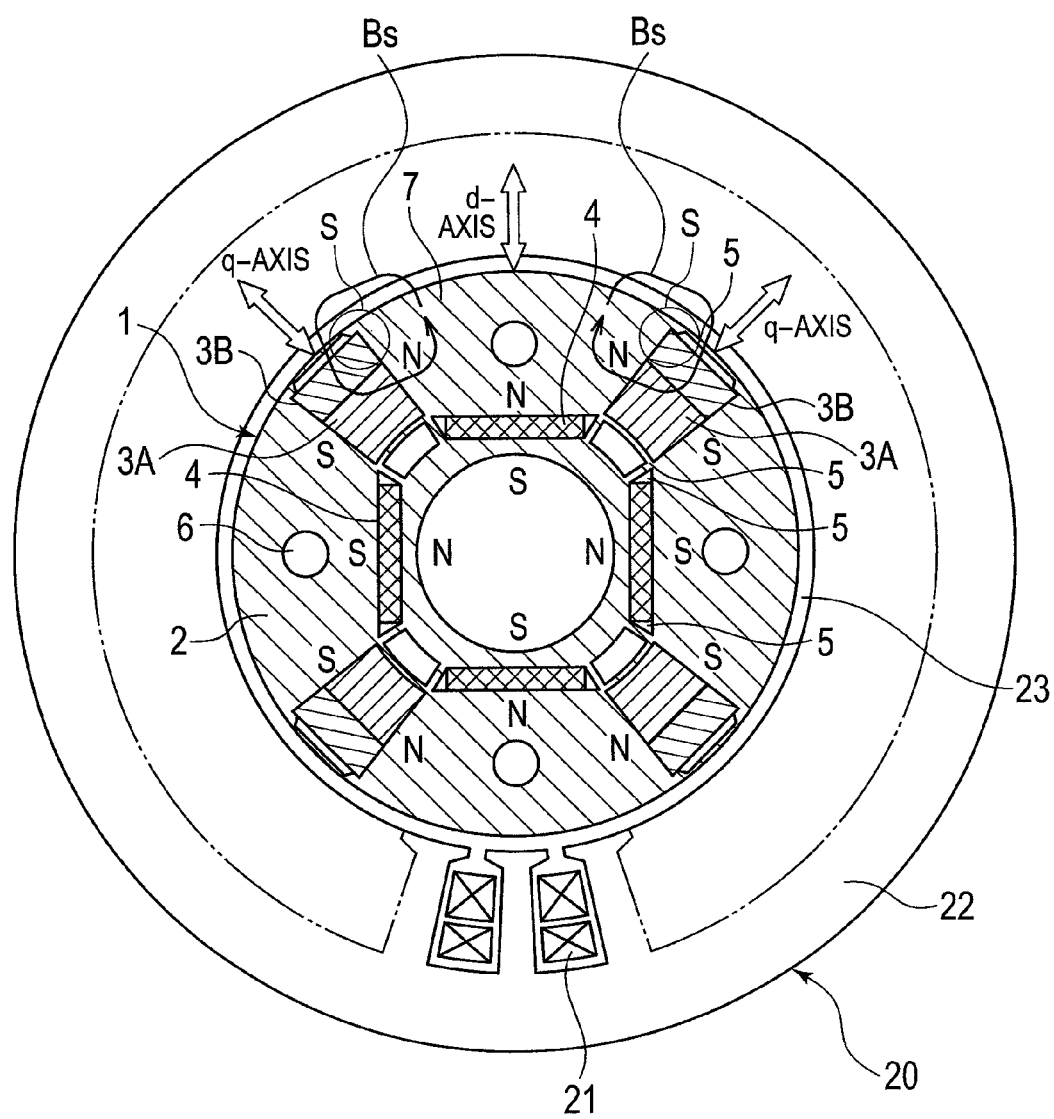
FIG. 16 is a sectional view of a permanent-magnet-type rotating electrical machine according to a ninth embodiment of the present invention.

A permanent-magnet-type rotating electrical machine according to the ninth embodiment of the present invention will be explained with reference to FIG. 16. FIG. 16 illustrates a structure of the permanent-magnet-type rotating electrical machine according to the embodiment. This structure accommodates a rotor 1 in a stator 20 with an air gap 23 interposing between them. The stator 20 is similar to that of the related art of FIG. 20. Elements common to those of the permanent-magnet-type rotating electrical machine according to the first embodiment illustrated in FIG. 1 are represented with common reference marks to omit a repetition of explanation.

As illustrated in FIG. 16, the permanent-magnet-type rotating electrical machine according to the embodiment differs from the first embodiment in the structure of a first permanent magnet 3 that is embedded in the rotor 1 and is small in the product of coercive force and magnetizing direction thickness. The first permanent magnet 3 is made of two kinds of magnets, i.e., a permanent magnet 3A arranged on a diametrally outer side and a permanent magnet 3B arranged on a diametrally inner side. The permanent magnet 3A has a magnetic characteristic that its product of coercive force and magnetizing direction thickness is slightly larger than that of the permanent magnet 3B. For example, the permanent magnet 3A is an AlNiCo magnet and the permanent magnet 3B an FeCrCo magnet. Alternatively, the permanent magnets 3A and 3B are AlNiCo magnets with slightly different magnetic characteristics as mentioned above. Namely, the product of coercive force and magnetizing direction thickness of the permanent magnet 3A on the outer side is slightly larger than that of the permanent magnet 3B arranged on the inner side. The remaining configuration and the configuration of a drive system are the same as those of the first embodiment.

According to the first embodiment that employs the first permanent magnet 3 that is made of a single kind of magnet and is small in the product of coercive force and magnetizing direction thickness, flux Bs of a magnetic field for normal rotational driving always strongly acts on a shoulder part ("S" surrounded with a circle) on a diametrally outer side of a magnetic pole of the first permanent magnet 3, to cause a demagnetizing phenomenon even in a state passing no magnetizing current. To cope with this, the permanent-magnet-type rotating electrical machine according to the embodiment forms the first permanent magnet 3, which is demagnetized or whose magnetizing direction is inverted when a magnetizing current is passed, from the two kinds of permanent magnets, i.e., the permanent magnets 3A and 3B. Among them, the permanent magnet that is demagnetized or inverted in magnetizing direction by passing a magnetizing current is mainly the permanent magnet 3B, and the permanent 3B is arranged at the part S where a strong magnetic field acts during rotational driving, the permanent magnet 3B having a larger product of coercive force and magnetizing direction thickness than the permanent magnet 3A, to resist against demagnetization caused by the strong magnetic field.

As a result, the permanent-magnet-type rotating electrical machine according to the embodiment generates high torque (high output) at lower rotation speed than the permanent-magnet-type rotating electrical machine according to the first embodiment and is capable of conducting variable-speed operation in a wide range from low speed to high speed and realizing high-efficiency operation in the wide operation range.

The configuration of the embodiment that provides the first permanent magnet with the divided configuration consisting of two or more kinds of permanent magnets is applicable not only to the first permanent magnet 3 of the first embodiment but also to the first permanent magnet 3 of the permanent-magnet-type rotation electrical machine of any one of FIGS. 13 to 16.

[Tenth Embodiment]

A permanent-magnet-type rotating electrical machine according to the tenth embodiment of the present invention is characterized in that, when each of the first to ninth embodiments inserts the rotor 1 into the stator during an assembling process, the AlNiCo permanent magnets 3 are magnetized so that flux by the AlNiCo permanent magnets 3 and flux by the NdFeB permanent magnets 4 are oppositely oriented at each pole core portion 7 or the air gap face.

When assembling the magnetized rotor 1 and the stator together in a manufacturing process, some measure must be taken against magnetic attraction of the permanent magnets. Magnetizing the magnets so that flux of the AlNiCo permanent magnets 3 and flux of the NdFeB permanent magnets 4 are oppositely oriented helps reduce the total flux amount of the permanent magnets in the rotor 1. This results in reducing the magnetic attraction between the rotor and the stator, to improve workability of the assembling work. If the flux amount generated by the AlNiCo permanent magnets 3 and NdFeB permanent magnets 4 is zeroed, there will be no magnetic attraction, so that the rotor can very easily be assembled with the stator.

In each of the first to ninth embodiments, repair and maintenance will be carried out through disassembling work that pulls out the rotor 1 from the stator. At this time, it is also preferable to magnetize the AlNiCo permanent magnets 3 so that flux by the AlNiCo permanent magnets 3 and flux by the NdFeB permanent magnets 4 are oppositely oriented at each pole core portion 7 or the air gap face. Magnetizing the AlNiCo permanent magnets 3 so that flux by the AlNiCo permanent magnets 3 and flux by the NdFeB permanent magnets 4 are oppositely oriented at the time of disassembling reduces flux amount of the permanent magnets of the rotor 1 and magnetic attraction between the rotor and the stator, thereby improving the workability of disassembling. If the flux amount generated by the AlNiCo permanent magnets 3 and NdFeB permanent magnets 4 is zeroed, there will be no magnetic attraction force, so that the rotor is easily pulled out from the stator.

Although each of the above-mentioned embodiments relates to a four-pole rotating electrical machine, the present invention is also applicable to multipole rotating electrical machines such as eight-pole rotating electrical machines. Depending on the number of poles, the arrangements, positions, and shapes of permanent magnets must properly be changed to provide the same actions and effects as those provided by the embodiments.

Permanent magnets that form magnetic poles are each identified according to the product of coercive force and magnetizing direction thickness. Accordingly, the same actions and effects will be obtained by forming each magnetic pole with permanent magnets of the same kind having different magnetizing direction thicknesses.

[Eleventh Embodiment]

Figure 17:
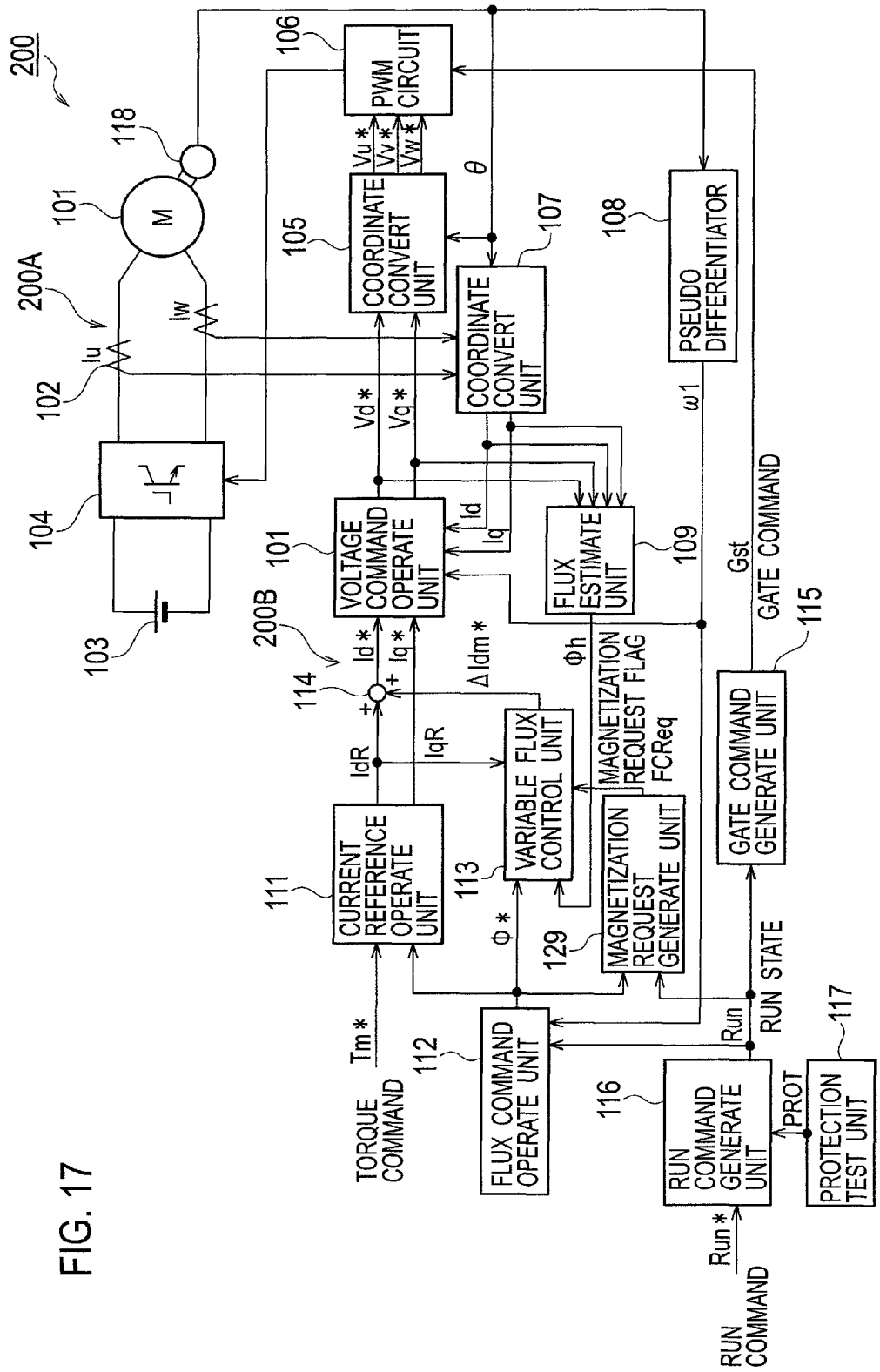
FIG. 17 is a block diagram of a permanent magnet motor drive system according to an eleventh embodiment of the present invention.

A permanent magnet motor drive system 200 according to the eleventh embodiment of the present invention will be explained with reference to FIGS. 17 to 19. The permanent magnet motor drive system of this embodiment is usable in place of the drive system of the above-mentioned first embodiment, to drive and control the permanent-magnet-type rotating electrical machine of any one of the first to ninth embodiments. In FIG. 17, parts common to the first embodiment illustrated in FIG. 7 are represented with the same reference marks.

The variable-flux permanent magnet motor drive system 200 according to the embodiment includes a main circuit 200A and a control circuit 200B and differs from the first embodiment illustrated in FIG. 1 in that the control circuit 200B additionally includes a flux estimate unit 109 to estimate a flux Φh with the use of voltage commands Vd* and Vq* from a voltage command operate unit 110, d- and q-axis currents Id and Iq from a coordinate convert unit 107, and a rotor rotational angle frequency ω1 and output the estimated flux to a variable flux control unit 113. In addition, the variable flux control unit 113 has a configuration illustrated in FIG. 19. The configuration of the main circuit 200A is the same as that of the main circuit 100A of FIG. 7.

The flux estimate unit 109 uses the d- and q-axis voltage commands Vd* and Vq*, d- and q-axis currents Id and Iq, and rotor rotational angle frequency ω1 (inverter frequency), to estimate the d-axis flux amount as follows:

[Math. 7]

$$\Phi h = (Vq^* - R1 \times Iq - \omega 1 \times Ld \times Id - Lq \times dIq/dt)/\omega 1 \qquad (1)$$

The estimated flux value Φh and a flux command Φ* from a flux command operate unit 112 are inputted to the variable flux control unit 113.

Figure 18:
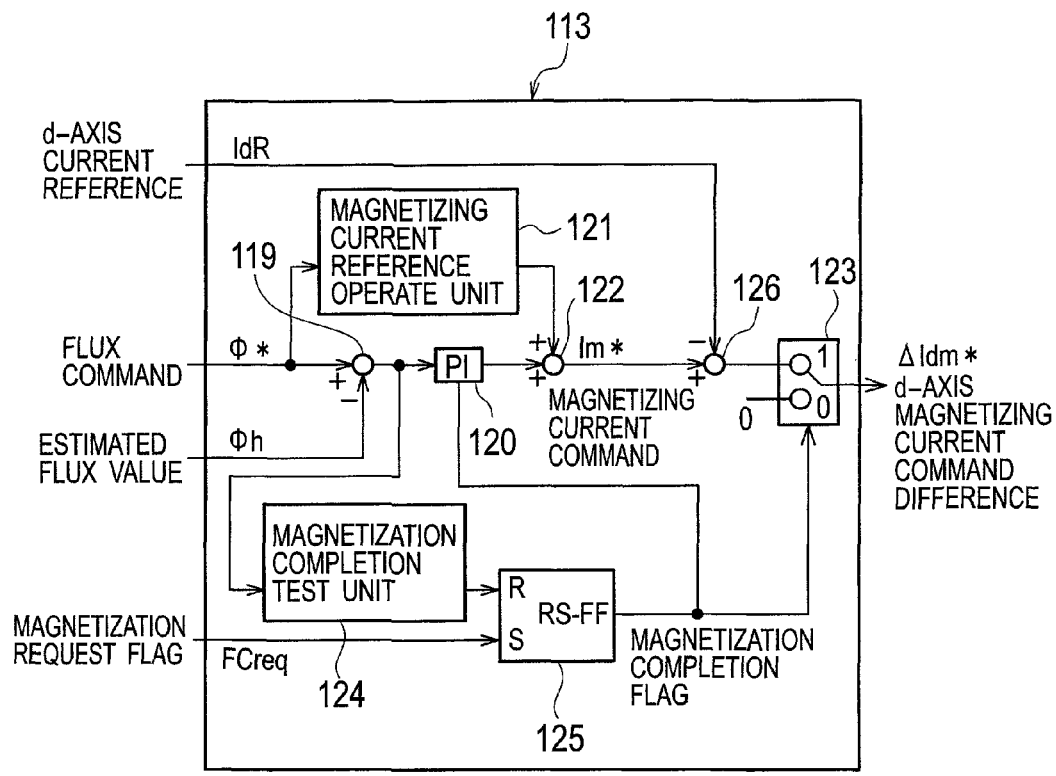
FIG. 18 is a block diagram illustrating an internal structure of a variable flux control unit in the permanent magnet motor drive system according to the above-mentioned embodiment.

A detailed configuration of the variable flux control unit 113 of this embodiment is illustrated in FIG. 18. A subtracter 119 calculates a deviation between the flux command Φ* and the estimated flux value Φh and supplies the deviation to a PI control unit 120. The flux command Φ* is inputted to a magnetizing current reference operate unit 121. The magnetizing current reference operate unit 121 calculates a magnetizing current command Im* with the use of a table or a functional equation, so that magnetization is carried out to realize flux corresponding to the flux command Φ*. At this time, the above-mentioned BH characteristic is used. An adder 122 adds an output from the magnetizing current reference operate unit 121 to an output from the PI control unit 120.

The adder 122 provides the magnetizing current command Im*. For magnetization, the magnetizing current command Im* is applied as a d-axis current command Id*. To make Id* and Im* agree with each other, the embodiment uses a subtracter 126 to subtract a d-axis current reference IdR from the magnetizing current command Im* and provide a d-axis magnetizing current command difference ΔIdm*. This difference is added to the d-axis current reference IdR by an adder 114 of FIG. 18, and therefore, the d-axis current command Id* agrees with the magnetizing current command Im*.

A switch 123 in the variable flux control unit 113 selects one of two inputs according to a magnetization completion flag to be explained later and outputs the magnetizing current command Idm*. If the magnetization completion flag is 0 (magnetization completed), the d-axis magnetizing current command difference ΔIdm* is set to zero. If the magnetization completion flag is 1 (in magnetization), the output of the adder 122 is provided as ΔIdm*.

The deviation between the flux command Φ* and the estimated flux value Φh is also supplied from the subtracter 119 to a magnetization completion test unit 124. The magnetization completion test unit 124 provides 1 if the absolute value of the flux deviation is smaller than a predetermined value α, and if it is greater than α, provides 0. A flip-flop (RS-FF) 125 receives a magnetization request flag FCreq at a set terminal S and the output from the magnetization completion test unit 124 at a reset terminal R. An output from the RS-FF 125 is the magnetization completion flag, which is inputted to the PI control unit 120 and switch 123. If the magnetization completion flag is 0, it indicates that magnetization has been completed, and if 1, it indicates that magnetization is in progress.

The estimated flux value Φh from the flux estimate unit 109 is also inputted to a current reference operate unit 111. The current reference operate unit 111 uses the estimated flux value Φh, instead of the flux command Φ* used by the expression of the first embodiment, and calculates d- and q-axis current references IdR and IqR as follows:

[Math. 8]

$$IqR = (-\Phi h + \sqrt{\Phi h^2 - 4 \times (Ld-Lq) \times K \times Tm^*})/2 \times (Ld-Lq) \times K \quad (11)$$

$$IdR = K \times IqR \quad (12)$$

With the above-mentioned configuration, this embodiment provides actions and effects mentioned below. If there is a magnetization request, the magnetization request flag rises to 1 at least instantaneously. The RS-FF 125 is then set to provide the magnetization completion flag of 1 to indicate that magnetization is in progress. The switch 123 provides the magnetizing current command Im* based on the outputs from the PI control unit 120 and magnetizing current reference operate unit 121. The magnetizing current reference operate unit 121 provides, in a feed-forward manner, a magnetizing current based on a beforehand grasped BH characteristic so as to achieve the flux command Φ*. This results in instantaneously carrying out magnetization up to nearly the command value. Since the duration of magnetization is shortened, the generation of unnecessary torque or loss can be suppressed. The BH characteristic may be obtained beforehand through tests.

As mentioned above, it is difficult to precisely make flux agree with a specified value. Accordingly, this embodiment corrects the magnetizing current Im* as illustrated in FIG. 19 so that the flux deviation approaches 0 due to the action of the PI control unit 120 in the variable flux control unit 113. In the last stage, this makes the flux command Φ* and estimated flux value Φh (i.e., actual flux if there is no estimation error) agree with each other. This improves a flux amount repetition accuracy in a magnetization process and increases a torque accuracy.

Figure 19:
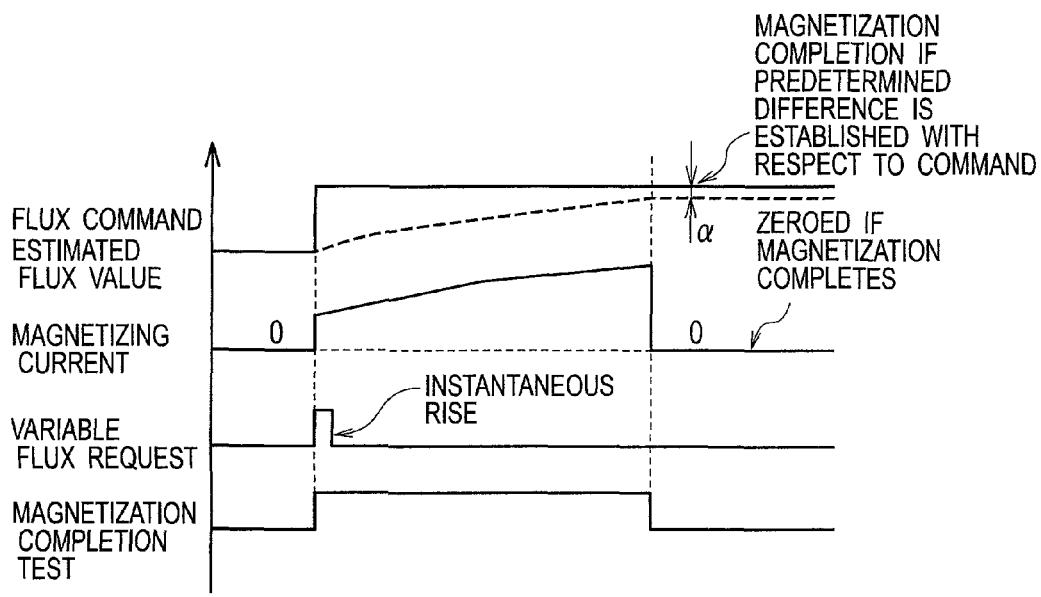
FIG. 19 is a timing chart of motor control by the permanent magnet motor drive system according to the above-mentioned embodiment.

According to this embodiment, the magnetization completion test unit 124 in the variable flux control unit 113 outputs 1 if the absolute value of the flux deviation comes in the predetermined range α as illustrated in FIG. 19, to indicate that a specified flux amount has actually been attained and magnetization has been completed. In response to the reset request, the RS-FF 125 provides the magnetization completion flag of 0. In this way, when the estimated flux value agrees with the flux command Φ*, the magnetization process is terminated. As a result, this embodiment improves a flux amount repetition accuracy in a magnetization process and increases a torque accuracy.

According to this embodiment, the d- and q-axis current references IdR and IqR are generated with the use of the estimated flux value Φh estimated from voltages and currents, and therefore, d- and q-axis current commands are corrected according to actual conditions even if a flux amount varies due to a magnetization process. Since d- and q-axis currents are passed according to the d- and q-axis current commands, an influence of flux amount variation on torque can be reduced and a torque accuracy can be improved.

This embodiment is based on an estimated flux value. The estimated flux value includes motor inductances such as Ld and Lq. These values vary according to magnetic saturation. In particular, the variable-flux motor changes its magnetic saturation depending on a variable flux amount. It is, therefore, advantageous for improving a flux estimation accuracy and torque accuracy to employ a function or table that receives an estimated value of variable flux and outputs a motor inductance.

Even if such a table is prepared, it is sometimes difficult to correctly grasp the inductance characteristics. In this case, the flux estimation may be replaced with a flux detector consisting of Hall elements and the like to detect an actual flux value Φr and use the same in place of the estimated flux value Φh. This will further improve a flux estimation accuracy and torque accuracy.

Although embodiments of the present invention have been explained above, the present invention is not limited to the above-mentioned embodiments. Permanent-magnet-type rotating electrical machines and permanent magnet motor drive systems mentioned below also fall in the technical scope of the present invention.

(1) A permanent-magnet-type rotating electrical machine including a rotor with first and second permanent magnets of different magnetic characteristics embedded in a rotor core symmetrically with respect to a rotation center, a stator arranged to surround the rotor with a magnetic air gap interposing between them, and an armature coil formed on an inner circumferential part of the stator facing the magnetic air gap, the magnetic characteristics of the first permanent magnet in the rotor being a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range, the magnetic characteristics of the second permanent magnet in the rotor being a coercive force larger than that of the first permanent magnet and a remanent flux density of 0.6 T or over, the product of the coercive force and magnetizing direction thickness of the first permanent magnet being equal to or larger than the product of the field strength and magnetizing direction thickness of the second permanent magnet at a no-load operating point, a magnetic field created by a current of the armature coil at a magnetic pole magnetizing the first permanent magnet so as to irreversibly change a flux amount of the first permanent magnet, wherein the product of coercive force and magnetizing direction thickness of the first permanent magnet is smaller than the product of coercive force and magnetizing direction thickness of the second permanent magnet and equal to or larger than the product of magnetic field strength and magnetizing direction thickness at a no-load operating point of the second permanent magnet.

(2) In the above-mentioned permanent-magnet-type rotating electrical machine, the magnetizing direction thickness of the first permanent magnet is larger than the magnetizing direction thickness of the second permanent magnet.

(3) In the above-mentioned permanent-magnet-type rotating electrical machine, the first permanent magnet is magnetized by a magnetic field formed by a current of the armature coil, to invert the polarity thereof.

(4) In the above-mentioned permanent-magnet-type rotating electrical machine, the first permanent magnet is magnetized by a magnetic field formed by a current of the armature coil at the magnetic pole, to irreversibly change the flux amount thereof and the change continues until a linkage flux amount of the armature coil due to all permanent magnets becomes zero.

(5) In the above-mentioned permanent-magnet-type rotating electrical machine, the first permanent magnet is arranged in such a way as to receive a biasing magnetic field from the second permanent magnet.

(6) In the above-mentioned permanent-magnet-type rotating electrical machine, the first and second permanent magnets have different magnetizing directions.

(7) In the above-mentioned permanent-magnet-type rotating electrical machine, the magnetic pole is arranged at a position where an angle between the magnetizing direction of the first permanent magnet and a q-axis is larger than an angle between the magnetizing direction of the second permanent magnet and the q-axis.

(8) In the above-mentioned permanent-magnet-type rotating electrical machine, the magnetic pole is arranged at a position where the magnetizing direction of the second permanent magnet becomes the direction of a d-axis or a radial direction.

(9) In the above-mentioned permanent-magnet-type rotating electrical machine, the magnetic pole is arranged at a position where the magnetizing direction of the first permanent magnet becomes a circumferential direction.

(10) In the above-mentioned permanent-magnet-type rotating electrical machine, the second permanent magnet is embedded in the rotor core and is shaped so that a central part thereof is closer to the magnetic air gap than ends thereof to the same.

(11) In the above-mentioned permanent-magnet-type rotating electrical machine, a distance between the central part of the second permanent magnet and an air gap face of the rotor core is so set not to magnetically saturate the rotor core in the vicinity of the central part of the second permanent magnet with flux of all permanent magnets.

(12) In the above-mentioned permanent-magnet-type rotating electrical machine, a part of a magnetic path connected in series with the second permanent magnet in a magnetic circuit has a sectional area that is substantially magnetically saturated with flux of the second permanent magnet.

(13) In the above-mentioned permanent-magnet-type rotating electrical machine, the second permanent magnet has a remanent flux density of 1.3 T or over at 20° C.

(14) In the above-mentioned permanent-magnet-type rotating electrical machine, the second permanent magnet is an NdFeB-based permanent magnet containing little Dy element.

(15) In the above-mentioned permanent-magnet-type rotating electrical machine, a flux density $\phi PM2$ of the second permanent magnet is set so that a counter electromotive voltage generated by the second permanent magnet at a maximum rotation speed $\omega$ of the rotor is equal to or lower than a withstand voltage E of electronic parts of an inverter serving as a power source of the rotating electrical machine, to satisfy the condition of $\phi PM2 \leqq E/\omega \cdot N$ (N being the number of turns of the armature coil).

(16) In the above-mentioned permanent-magnet-type rotating electrical machine, the rotor core is shaped so that magnetic resistance in the direction of the d-axis that is a pole center axis of the rotor is small and magnetic resistance in the direction of the q-axis that is an inter-pole center axis is large.

(17) In the above-mentioned permanent-magnet-type rotating electrical machine, the first permanent magnet is configured so that magnetic resistance becomes higher at an end thereof on the magnetic air gap side.

(18) In the above-mentioned permanent-magnet-type rotating electrical machine, the first permanent magnet is arranged in the vicinity of the q-axis and a part of the rotor core in the vicinity of the q-axis on the magnetic air gap side is recessed from an outermost circumference of the rotor core.

(19) In the above-mentioned permanent-magnet-type rotating electrical machine, the first permanent magnet is arranged in the vicinity of the q-axis, a pole center part of the rotor core aligned with the d-axis is set to be an outermost peripheral part of the rotor, and a part of the rotor core between the vicinity of the pole center part on the d-axis and the vicinity of the q-axis is recessed from the outermost peripheral part of the rotor.

(20) In the above-mentioned permanent-magnet-type rotating electrical machine, the first permanent magnet is made of two kinds of permanent magnets having different coercive forces, the permanent magnet with larger coercive force being arranged on a diametrally outer side and the permanent magnet with smaller coercive force on a diametrally inner side.

(21) A permanent magnet motor drive system including a permanent magnet motor using permanent magnets, an inverter to drive the permanent magnet motor, and a magnetizing unit to pass a magnetizing current for controlling fluxes of the permanent magnets, the permanent magnet motor including a rotor with first and second permanent magnets of different magnetic characteristics embedded in a rotor core symmetrically with respect to a rotation center, a stator arranged to surround the rotor with a magnetic air gap interposing between them, and an armature coil formed on an inner circumferential part of the stator facing the magnetic air gap, the magnetizing unit passing for a short time a d-axis current of the armature coil of the permanent magnet motor, to generate a magnetic field that magnetizes the first permanent magnet at each magnetic pole so as to irreversibly change a flux amount of the permanent magnet and changing the current phase of a current passed to the armature coil, to pass a magnetizing current, the magnetic characteristics of the first permanent magnet in the rotor being a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range, the magnetic characteristics of the second permanent magnet in the rotor being a coercive force larger than that of the first permanent magnet and a remanent flux density of 0.6 T or over, the product of the coercive force and magnetizing direction thickness of the first permanent magnet being equal to or larger than the product of the field strength and magnetizing direction thickness of the second permanent magnet at a no-load operating point, the first and second permanent magnets that form the magnetic pole being arranged and magnetized so that fluxes thereof become additive to each other, a magnetic field being formed by a current of the armature coil, to magnetize the first permanent magnet and irreversibly reduce linkage flux produced by the permanent magnets, a magnetic field being oppositely formed, after the reduction, by a current of the armature coil, to magnetize the first permanent magnet and irreversibly increase an amount of the linkage flux, the first and second permanent magnets that form the magnetic pole being arranged and magnetized so that fluxes thereof become additive to each other, a magnetic field in a first direction produced by a current of the armature coil magnetizing the first permanent magnet, to invert the polarity thereof, a magnetic field being produced, after the inversion, by a current of the armature coil in a second direction that is opposite to the first direction, to again invert the polarity of the first permanent magnet to the original polarity.

(22) In the above-mentioned permanent magnet motor drive system, the magnetic field by the d-axis current magnetizes the first permanent magnet to irreversibly change a flux amount thereof or inverts the polarity of the first permanent magnet, and at the time of passing the d-axis current to magnetize the first permanent magnet, a q-axis current is passed to control torque.

(23) In the above-mentioned permanent magnet motor drive system, there are provided the operation of magnetizing the first permanent magnet with a magnetic field produced by the d-axis current, to irreversibly change a flux amount thereof or the operation of inverting the polarity of the first permanent magnet, and an operation of making flux created by the d-axis current substantially reversibly change a current and a linkage flux amount of the armature coil caused by the permanent magnets.

(24) In the above-mentioned permanent magnet motor drive system, the first permanent magnet is magnetized, if torque is at the maximum, so as to make flux of the first permanent magnet and flux of the second permanent magnet additive to each other at each magnetic pole, and if load is light with small torque or if speed is in a middle or high zone, the first permanent magnet is magnetized with a magnetic field created by a current, to reduce the flux thereof or invert the polarity thereof.

The invention claimed is:

1. A permanent-magnet-type rotating electrical machine comprising:
    a rotor with first and second permanent magnets of different magnetic characteristics embedded in a rotor core symmetrically with respect to a rotation center;
    a stator arranged to surround the rotor with a magnetic air gap interposing between them; and
    an armature coil formed on an inner circumferential part of the stator facing the magnetic air gap,
    the magnetic characteristics of the first permanent magnet in the rotor being a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range,
    the magnetic characteristics of the second permanent magnet in the rotor being a coercive force larger than that of the first permanent magnet and a remanent flux density of 0.6 T or over,
    the product of the coercive force and magnetizing direction thickness of the first permanent magnet being equal to or larger than the product of the field strength and magnetizing direction thickness of the second permanent magnet at a no-load operating point,
    a magnetic field created by a current of the armature coil at a magnetic pole magnetizing the first permanent magnet so as to irreversibly change a flux amount of the first permanent magnet.

2. The permanent-magnet-type rotating electrical machine of claim 1, wherein:
    the product of coercive force and magnetizing direction thickness of the first permanent magnet is smaller than the product of coercive force and magnetizing direction thickness of the second permanent magnet, and is equal to or larger than the product of magnetic field strength and magnetizing direction thickness at a no-load operating point of the second permanent magnet.

3. The permanent-magnet-type rotating electrical machine of claim 1, wherein:
    the first permanent magnet is magnetized by a magnetic field formed by a current of the armature coil, to invert the polarity thereof.

4. The permanent-magnet-type rotating electrical machine of claim 1, wherein:
    the first permanent magnet is magnetized by a magnetic field formed by a current of the armature coil at the magnetic pole, to irreversibly change the flux amount thereof, and the change continues until a linkage flux amount of the armature coil due to all permanent magnets becomes zero.

5. The permanent-magnet-type rotating electrical machine of claim 1, wherein:
    the magnetic pole is arranged at a position where the magnetizing direction of the first permanent magnet becomes a circumferential direction, and the magnetizing direction of the second permanent magnet becomes the direction of a d-axis or a radial direction.

6. A permanent magnet motor drive system comprising:
    a permanent magnet motor using permanent magnets;
    an inverter to drive the permanent magnet motor; and
    a magnetizing unit to pass a magnetizing current for controlling fluxes of the permanent magnets,
    the permanent magnet motor including a rotor with first and second permanent magnets of different magnetic characteristics embedded in a rotor core symmetrically with respect to a rotation center, a stator arranged to surround the rotor with a magnetic air gap interposing between them, and an armature coil formed on an inner circumferential part of the stator facing the magnetic air gap,
    the magnetizing unit passing for a short time a d-axis current of the armature coil of the permanent magnet motor, to generate a magnetic field that magnetizes the first permanent magnet at each magnetic pole so as to irreversibly change a flux amount of the permanent magnet and to change the current phase of a current passed to the armature coil, to pass a magnetizing current,
    the magnetic characteristics of the first permanent magnet in the rotor being a coercive force of 100 kA/m to 300 kA/m, a remanent flux density of 0.6 T or over, and a knickpoint of 0.6 T or over, the knickpoint being a point on a hysteresis curve where a reversible magnetizing range shifts to an irreversible magnetizing range,
    the magnetic characteristics of the second permanent magnet in the rotor being a coercive force larger than that of the first permanent magnet and a remanent flux density of 0.6 T or over,
    the product of the coercive force and magnetizing direction thickness of the first permanent magnet being equal to or larger than the product of the field strength and magnetizing direction thickness of the second permanent magnet at a no-load operating point,
    the first and second permanent magnets that form the magnetic pole being arranged and magnetized so that fluxes thereof become additive to each other, a magnetic field being formed by a current of the armature coil, to magnetize the first permanent magnet and irreversibly reduce linkage flux produced by the permanent magnets, and after the reduction, a magnetic field being oppositely formed by a current of the armature coil, to magnetize the first permanent magnet and irreversibly increase an amount of the linkage flux.

7. The permanent magnet motor drive system of claim 6, wherein:

the magnetic field by the d-axis current magnetizes the first permanent magnet to irreversibly change a flux amount thereof or invert the polarity of the first permanent magnet, and at the time of passing the d-axis current to magnetize the first permanent magnet, a q-axis current is passed to control torque.

8. The permanent magnet motor drive system of claim 6, wherein:

the first permanent magnet is magnetized, if torque is at the maximum, so as to make flux of the first permanent magnet and flux of the second permanent magnet additive to each other at each magnetic pole, and if load is light with small torque or if speed is in a middle or high zone, the first permanent magnet is magnetized with a magnetic field created by a current, to reduce the flux thereof or invert the polarity thereof.

* * * * *